United States Patent
Govindarajan et al.

(10) Patent No.: US 11,811,865 B2
(45) Date of Patent: Nov. 7, 2023

(54) BLOCKCHAIN DECLARATIVE DESCRIPTOR FOR CROSS-NETWORK COMMUNICATION

(71) Applicant: International Business Machines Corporation, Armonk, NY (US)

(72) Inventors: Chander Govindarajan, Bangalore (IN); Bishakh Chandra Ghosh, Bolpur (IN); Nitin Gaur, Roundrock, TX (US); Venkatraman Ramakrishna, Bangalore (IN); Dushyant K. Behl, Bangalore (IN); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/225,865

(22) Filed: Apr. 8, 2021

(65) Prior Publication Data

US 2022/0329653 A1    Oct. 13, 2022

(51) Int. Cl.
*H04L 67/104* (2022.01)
*H04L 67/1061* (2022.01)
*H04L 9/32* (2006.01)
*H04L 9/00* (2022.01)

(52) U.S. Cl.
CPC ........ *H04L 67/1059* (2013.01); *H04L 9/3218* (2013.01); *H04L 9/3247* (2013.01); *H04L 67/1065* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,454,878 B2 | 10/2019 | Khan et al. | |
| 10,693,956 B1* | 6/2020 | Green | H04L 63/0428 |
| 10,757,084 B1 | 8/2020 | Yu | |
| 2019/0026821 A1* | 1/2019 | Bathen | G06Q 40/00 |
| 2019/0066065 A1 | 2/2019 | Wright et al. | |
| 2020/0184489 A1* | 6/2020 | Negi | G06F 16/258 |
| 2020/0218795 A1* | 7/2020 | Antar | G06Q 20/0655 |
| 2021/0143995 A1* | 5/2021 | Baek | H04L 9/3247 |
| 2022/0006640 A1* | 1/2022 | Handville | H04L 67/55 |
| 2022/0094555 A1* | 3/2022 | Roy | G06Q 20/065 |
| 2022/0150072 A1* | 5/2022 | Jacob | H04L 9/3213 |

OTHER PUBLICATIONS

Abebe et al., Enabling Enterprise Blockchain Interoperability with Trusted Data Transfer (industry track), Middleware 19, Dec. 9-13, 2019, Davis CA, USA.

(Continued)

*Primary Examiner* — Mohamed A. Wasel
*Assistant Examiner* — Gregory P Tolchinsky

(57) ABSTRACT

An example operation may include one or more of retrieving decentralized identifiers (DIDs) of a plurality of blockchain peers included within a blockchain network, generating a blockchain declarative descriptor (BDD) which uniquely identifies the blockchain network, where the BDD comprises a machine-readable data file with a first field includes the retrieved DIDs of the blockchain network, a second field including signature data of the plurality of blockchain peers, and a third field including metadata, and transmitting the generated BDD to a blockchain network registry.

14 Claims, 22 Drawing Sheets

(56) References Cited

OTHER PUBLICATIONS

Anonymous, A method for, creating a declarative and immutable blockchain build system, an IP.com Prior Art Database Technical Disclosure, IP.com No. IPCOM000252822D, IP.com Electronic Publication Date: Feb. 14, 2018.

Anonymous, Blockchain A disruptive technology with the power to revolutionize financial services, a white paper by Equisoft, Mar. 2017.

Anonymous, Method and Apparatus for Application Driven Blockchain Trust Selection system in Blockchain Fabric, an IP.com Prior Art Database Technical Disclosure, IP.com No. IPCOM000246059D, IP.com Electronic Publication Date: Apr. 29, 2016.

Anonymous, Method and System for Articulating Blockchain Business Network Assurance, an IP.com Prior Art Database Technical Disclosure, IP.com No. IPCOM000257727D, IP.com Electronic Publication Date: Mar. 6, 2019.

Haslofer, Can a Blockchain Solve the Trust Problem?, NGI Talks, Mar. 26, 2019.

Rao et al., Efficient Path Characteristics Orchestration for Blockchain Applications; an IP.com Prior Art Database Technical Disclosure, IP.com No. IPCOM000250842D, IP.com Electronic Publication Date: Sep. 8, 2017.

* cited by examiner

BLOCKCHAIN DECLARATIVE DESCRIPTOR FOR CROSS-NETWORK COMMUNICATION

BACKGROUND

A centralized platform stores and maintains data in a single location. This location is often a central computer, for example, a cloud computing environment, a web server, a mainframe computer, or the like. Information stored on a centralized platform is typically accessible from multiple different points. Multiple users or client workstations can work simultaneously on the centralized platform, for example, based on a client/server configuration. A centralized platform is easy to manage, maintain, and control, especially for purposes of security because of its single location. Within a centralized platform, data redundancy is minimized as a single storing place of all data also implies that a given set of data only has one primary record.

SUMMARY

One example embodiment provides an apparatus that includes a network interface configured to retrieve decentralized identifiers (DIDs) of a plurality of blockchain peers included within a blockchain network, and a processor configured to one or more of generate a blockchain declarative descriptor (BDD) which uniquely identifies the blockchain network, where the BDD comprises a machine-readable data file with a first field that includes the retrieved DIDs of the blockchain network, a second field that includes signature data of the plurality of blockchain peers, and a third field that includes metadata, and transmit the generated BDD to a blockchain network registry.

Another example embodiment provides a method that includes one or more of retrieving decentralized identifiers (DIDs) of a plurality of blockchain peers included within a blockchain network, generating a blockchain declarative descriptor (BDD) which uniquely identifies the blockchain network, where the BDD comprises a machine-readable data file with a first field includes the retrieved DIDs of the blockchain network, a second field including signature data of the plurality of blockchain peers, and a third field including metadata, and transmitting the generated BDD to a blockchain network registry.

A further example embodiment provides a method that includes one or more of querying a network registry for a blockchain declarative descriptor (BDD) of a first blockchain network, the BDD comprising a network structure and identifiers of a plurality of peers of the first blockchain network, retrieving a decentralized identifier (DIDs) of a peer of the first blockchain network from the first blockchain network, verifying the peer of the first blockchain network based on a comparison of the retrieved DID of the entity and the identifiers of the plurality of peers included in the BDD, and in response to successful verification, transmitting an inter-network communication from a peer in a second blockchain network to the peer in first blockchain network.

DETAILED DESCRIPTION

Figure 1A:
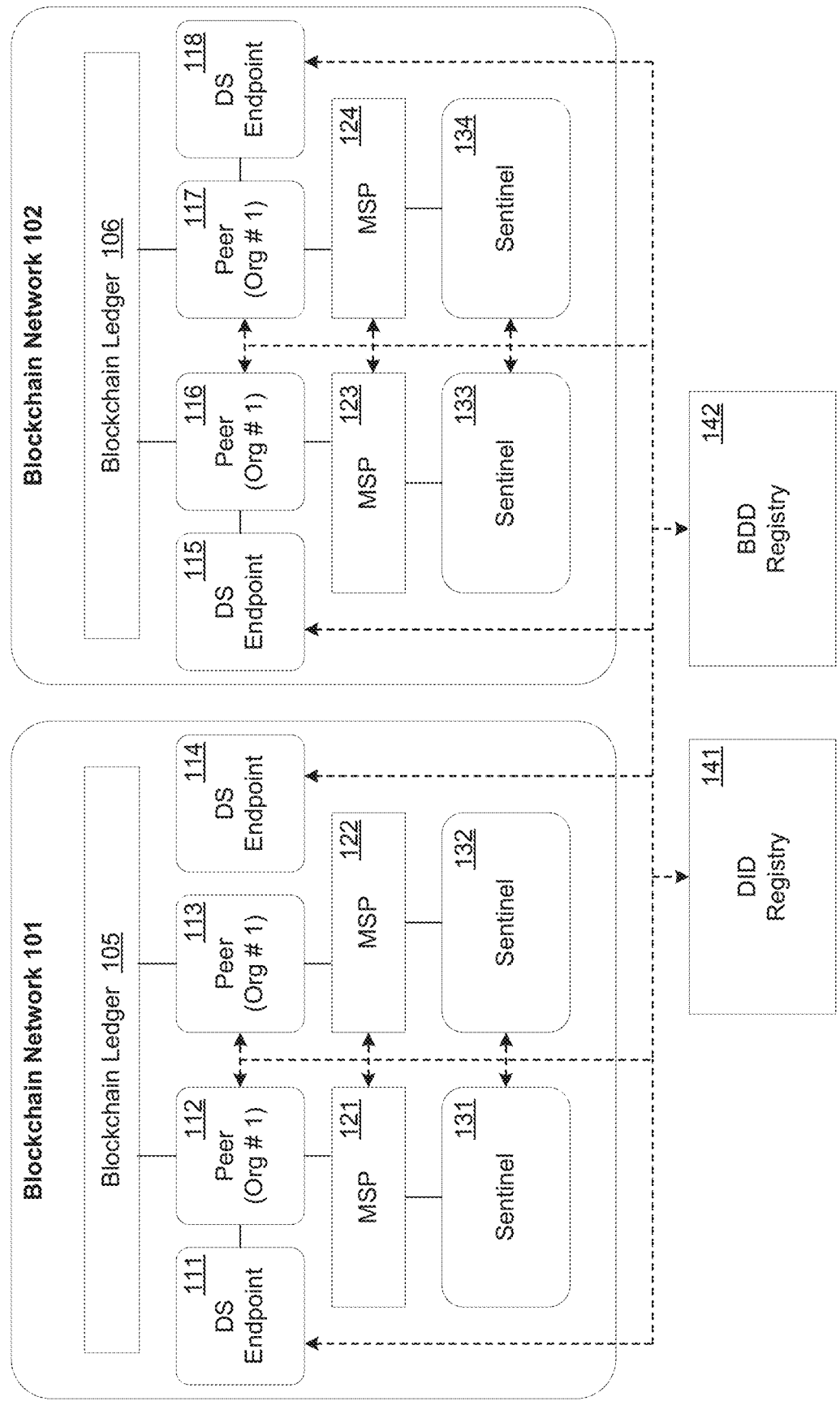
FIG. 1A is a diagram illustrating a communication environment that includes multiple blockchain networks according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which are directed to generating and verifying a blockchain declarative descriptor to facilitate trusted cross-network communications among blockchain networks.

In the example embodiments, each blockchain entity (e.g., peers, orderers, endorsers, clients, auditors, admins, etc.) may be assigned a unique decentralized identifier (DID) that identifies the blockchain entity within a blockchain network. A blockchain entity that possesses a DID may also be issued one or more verifiable credentials (VCs) which can be used by the blockchain entity to sign blockchain transactions, messages, blocks, and the like. In some embodiments, each blockchain entity may include a set of VCs which give the blockchain entity a set of claims. A claim, for example, may be a claim that a blockchain peer is authorized to sign a transaction for a particular smart contract (chaincode). As another example, a claim may be that a blockchain peer is authorized to transact on a particular channel/blockchain among a plurality of channels on a blockchain ledger. As another example, a claim may identity that the blockchain peer is an endorsing peer of the blockchain network, etc.

Each verifiable credential may be issued from an authority within a Self-Sovereign Identity (SSI) SSI network of the blockchain network, for example, a membership service provider (MSP), a certificate authority (CA), or the like. The verifiable credential may include "proof" such as a signature of the issuer of the verifiable credential. The SSI network may maintain all allocated DIDs, VCs, and the like. In addition, the SSI network may maintain schema information of each VC, a public key of the issuer that signed the public key, and the like. Members of the blockchain can access the registry to obtain the schema information and the public key of the issuer to verify the schema of the verifiable credential and the signature of the issuer, respectively. In this way, any of the blockchain entities can validate the verifiable credential without relying on a central authority.

To generate a blockchain declarative descriptor (BDD) according to various embodiments, the entities within a blockchain network may aggregate their identification information (e.g., DIDs, VCs, etc.) into a single verifiable credential (VC) that can be used to prove that any of the entities are participants within the blockchain network. In this way, the BDD is essentially a verifiable credential for the entire blockchain network. As an example, the BDD may include a claims field (e.g., data element) with a "network structure" embedded therein. The network structure may include a list of blockchain peers/organizations identified b their DIDs, chaincode names and peers that participate in the chaincode, endorsing peers, and the like. The claims field may also include a network alterations clause that describes how a new member can be added to the BDD and/or how an existing member can be removed from the BDD.

Furthermore, the proof section of the BDD may include a multi-signature proof. Here, each blockchain peer/organization that is part of the BDD may generate a signature over the claim field of the BDD. The signatures may be combined and stored together in the proof field of the BDD. The BDD may be stored in a network registry that is available to multiple blockchain networks. Thus, any other network may identify the membership of the blockchain network by the list of peers/organizations stored in the claim field, and verify the membership of a particular peer/organization based on the signatures stored in the proof field.

For example, when a first blockchain peer in a first blockchain network desires to communicate with a second blockchain peer in a second blockchain network, the first blockchain peer (or another service of the first blockchain network) may query the network registry for the BDD of the second blockchain network. The first blockchain peer may also query a sentinel agent/program of the second blockchain network for network information (e.g., a DID, VC, etc.) of the second blockchain peer. Here, the first blockchain peer may verify the second blockchain peer is a member of the second blockchain network based on a comparison of the DID to the list of DIDs in the claim field, as well as a signature of the second peer included in the proof section of the BDD. Thus, trusted communications can occur even though both participants are on different blockchain networks.

In one embodiment this application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes."In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments improve upon the security of cross-network interactions, where assets or data items are shared between permissioned blockchain ledgers. Participants (blockchain peers) can be authenticated by an external party such as a blockchain peer on a different blockchain network, using the BDD as described herein. Furthermore, portability and interoperability may be improved. Permissioned networks today possess their own proprietary identity management systems (for credential issuance and storage). This is not visible to parties outside the networks. By using BDD in place of these heterogeneous and opaque identity management systems, the example embodiments can ensure that network participants are known and can prove their authenticity outside their networks, thereby allowing data and assets to flow across network boundaries (in a policy-controlled way). Further, the BDD may be built around well-known identity providers or credential authorities such as membership service providers (MSPs) and credential authorities (CAs) that are not tied to a specific network. This enables portability of identity and credentials in inter-network interactions.

In the example embodiments, verifiable credentials can be issued to DID holders (network participants that rely on SSI). The verifiable credentials can be issued by issuers (members of the SSI network) that can be existing identity providers and certificate authorities within permissioned networks or they can be well-known external authorities. Within networks, issuers may include network or organizational (sub-division) CAs. In a Hyperledger Fabric network, these entities are called MSPs (membership service providers), which maintain chains of root and intermediate CAs. In a Corda network, there is a hierarchy of network CAs credentialing doormen CAs who in turn credential node CAs (each node having the ability to sign and approve transactions.) These MSPs or CAs represent either a network as a whole or sub-divisions within a network, and they issue/revoke identities and credentials (such as DIDs.) Outside of networks, the issuers may include external parties such as reputed CAs and credentialing authorities, like Verisign or the DMV. Other issuers can include existing organizations that choose to participate in a permissioned network, ad hoc authorities representing the consortium of organizations that comprises a business network, for example, a supply chain, a food trust network, etc. It should also be appreciated that the SSI networks are capable of managing identities of multiple networks' participants and facilitating identity-sharing across network boundaries.

In the example embodiments, a participant such as a blockchain peer or an ordering service may be issued a DID. The DID may be a unique identifier such as a URI that identifies the blockchain entity. For example, a DID enables verifiable, decentralized digital identity. A DID identifies any subject (e.g., a person, organization, thing, data model, abstract entity, etc.) that the controller of the DID decides that it identifies. In contrast to typical, federated identifiers, DIDs have been designed so that they may be decoupled from centralized registries, identity providers, and certificate authorities. Specifically, while other parties might be used to help enable the discovery of information related to a DID, the design enables the controller of a DID to prove control over it without requiring permission from any other party. DIDs are URIs that associate a DID subject with a DID document allowing trustable interactions associated with that subject.

Each DID document can express cryptographic material, verification methods, or services, which provide a set of mechanisms enabling a DID controller to prove control of the DID. Services enable trusted interactions associated with the DID subject. A DID document might contain the DID subject itself, if the DID subject is an information resource such as a data model. This document may specify a common data model, a URL format, and a set of operations for DIDs, DID documents, and DID methods. A DID is a simple text string consisting of three parts including a URI scheme identifier (did), and identifier for the DID method, and a DID method-specific identifier. DIDs are resolvable to DID documents. A DID URL extends the syntax of a basic DID to incorporate other standard URI components (path, query, fragment) in order to locate a particular resource, for example, a public key inside a DID document, or a resource available external to the DID document.

DID documents contain information associated with a DID. They typically express verification methods (such as public keys) and services relevant to interactions with the DID subject. A DID document can be serialized according to a particular syntax. The DID itself is the value of the id property. The properties present in a DID document may be updated. DID methods are the mechanism by which a particular type of DID and its associated DID document are created, resolved, updated, and deactivated using a particular verifiable data registry. DID methods are defined using separate DID method specifications. In the example embodiments, DIDs, VCs, VPs, and the like, may be stored on a blockchain ledger which includes the verifiable data registry.

An owner of a DID can be issued a VC establishing some property of the owner by a credential provider (e.g., DMV issuing a driver's license, University issuing a grade transcript, etc.) In the example embodiments, a verifiable credential may establish a property of a blockchain entity that holds the credential, for example, that the blockchain entity is an endorsing peer, that the blockchain entity is authorized to transact on a particular ledger, that the blockchain entity is authorized to execute/invoke a particular chaincode, etc. The binding is made secure and tamper-proof using digital signatures which may be recorded within the VC. Overall, DIDs have longer lifetimes than VCs (which have expiration times). Any network component such as a blockchain peer, orderer, endorser, client, etc. gets a DID at the beginning of operation. Subsequently, the participant can request for and obtain VCs from credentialing authorities that comprise the SSI network. Each VC can serve a different (and limited) purpose, like signing a transaction for inclusion in a block, or signing an asset state that is traded with a different network. How a VC may be used (using a VP, or verifiable presentation) may depend on policy; e.g., transaction commitment policy requires a signing peer to prove its membership in an organization that is part of a network.

Verifiable credentials and verifiable presentations may be serializable in one or more machine-readable data formats, for example, a comma separated value (CSV) file, an extensible markup language (XML) file, a JavaScript Object Notation (JSON) file, and the like. The process of serialization and/or de-serialization may be deterministic, bi-directional, and lossless. Any serialization of a verifiable credential or verifiable presentation may be transformable to the generic data model in a deterministic process such that the resulting verifiable credential can be processed in an interoperable fashion. The serialized form may also be able to be generated from the data model without loss of data or content. Furthermore, verifiable presentations (VPs) can either disclose the attributes of a verifiable credential, or satisfy derived predicates requested by a verifier. Derived predicates are Boolean conditions, such as greater than, less than, equal to, is in set, and so on.

In the example embodiments, a DID may be guaranteed to be unique only within the domain of a DID provider (or more typically, a registry), not globally. If a permissioned network, or group of permissioned networks, decide to trust a single DID registry, then a peer within that setup will have a unique DID. Otherwise, peers' DIDs can be globally resolved uniquely by the tuple <DID Registry, DID>.

In the example embodiments, a BDD is a verifiable credential of the blockchain network itself based on the individual DIDs of its participants. For validation and authentication of the BDD, a verifier that receives the BDD can also retrieve network information (DIDs, etc.) of any blockchain peer it desires to verify from a sentinel agent running in the blockchain network. The verifier may compare the DID received from the sentinel to the DIDs stored in the BDD to ensure that the blockchain peer is among the DIDs stored in the list. In addition, the verifier may also verify the existence of a signature of the blockchain peer included in the proof section of the BDD thereby ensuring proof of membership.

FIG. 1A illustrates a cross-network communication environment that includes multiple blockchain networks 101 and 102 according to example embodiments. Referring to FIG. 1A, blockchain network 101 includes a plurality of blockchain peers 112 and 113 which manage a blockchain ledger 105. The blockchain network 101 also includes discovery service endpoints 111 and 114 that can discover identity information of blockchain participants in the blockchain network 101. The discovery service endpoints 111 and 114 may be an organizations DID service endpoint and can be capable of fetching a BDD from a BDD registry 142. In addition, the blockchain network 101 also includes a membership service providers (MSPs) 121 and 122 which may abstract away cryptographic mechanisms and protocols behind issuing certificates, validating certificates, and user authentication. The MSPs 121 and 122 may define identity and rules by which the identities are governed within the blockchain network 101 such as authentication, signature generation, and the like. Although not shown in FIG. 1A, the blockchain network 101 may also include an ordering service, a certificate authority (CA), an admin, and the like.

According to various embodiments, the blockchain network 101 also includes sentinel agents 131 and 132. The sentinels 131 and 132 may be the endpoints of the blockchain network 101 that are queried/probed by other networks (e.g., any of the entities in blockchain network 102, etc.) The sentinels 131 and 132 may verify the querying entity before providing sensitive membership information to an external blockchain network, and only provide enough information to satisfy the request without divulging additional information. For example, if a peer in another network requests an identity of the blockchain peer 112, the sentinel 131 may provide only the network information (e.g., DID, VC, etc.) of the blockchain peer 112, without providing any additional information of the other peers and entities in the blockchain network 101. The sentinels 131 and 132 may enable secure, consent-based, privacy-preserving, discovery and sync of membership information with other networks.

Various mechanisms exist to ensure simultaneous trustworthiness of information and data privacy. The VC/VP mechanism by its very nature allows the revelation of certain credentials with signatures as proof while hiding other attributes one does not wish to claim in a given scenario. In the example embodiments, a sentinel 131 or 132 may provide some information (e.g., a list of peers/DIDs) while withholding certain other information/metadata about itself, thereby preserving privacy of the blockchain network when queried by an external network. In another example, the sentinels 131 and 132 may supply data with Zero-Knowledge Proofs (ZKPs) to reveal only certain attributes about the network in the BDD. The verification process would now include additional ZKP-verification steps through the sentinels 131 and 132. Here, the sentinels 131 and 132 ensure the privacy of sensitive information (including network membership info) while revealing them only when requested for valid business reasons.

In this example, the blockchain network 102 may include the same entities as the blockchain network 101 such as blockchain peers 116 and 117 which manage their own blockchain ledger 106, discovery service endpoints 115 and 118, MSPs 123 and 124, sentinels 133 and 134, and the like.

The entities in both of the blockchain networks 101 and 102 may receive decentralized identifiers (DIDs) from the DID registry 141 shown in FIG. 1A. The DID registry 141 may store a mapping between a unique identifier of an entity (e.g., the address, public key, URI, etc.) and a corresponding DID of that entity. Each participant that receives a DID may have a unique DID with respect to all other participants on all other networks.

According to various embodiments, each blockchain network 101 and 102 may generate their own BDD and store the BDD in a BDD registry 142. Here, the BDD may be stored with a name/identifier of the blockchain network, along with the BDD document that includes the claim field, the proof field, and the metadata. When a participant of the blockchain network 101 (e.g., peer 112) desires to query a peer (e.g., peer 116) in the blockchain network 102, or vice versa, the participant of the blockchain network 101 may request the BDD of the blockchain network 102 from the BDD registry 142. In addition, the participant of the blockchain network 101 may request membership information (e.g., DIDs, etc.) of any of the participants (e.g., peer 116, etc.) of the blockchain network 102 from one of the sentinels 133 and 134. The participant of the blockchain network 101 may compare the data from the sentinels 133 or 134 with the BDD to ensure that the peer 116 is a member of the blockchain network and has validly signed the BDD, prior to performing a cross-network communication.

Furthermore, the BDD may be updated at any time based on the alteration clause stored in the BDD. For example, a new peer or other entity may be added to the network structure and their signature added to the proof field of the BDD. Likewise, an existing peer may be removed from the network structure and their signature removed from the proof field. Permissioned blockchain networks are typically formed and maintained through dynamically changing agreements among its members. Interoperation requires the ability for external parties to securely identify the network and know its current membership. The BDD described herein enables a blockchain network to create and maintain a unique identity over time and membership changes. Furthermore, because each participant may provide a signature over the claim which is then stored in the proof section thus ensuring a decentralized management of the BDD. The trusted sentinel enables secure, consent-based, privacy-preserving, discovery and sync of other networks' descriptors.

Figure 1B:
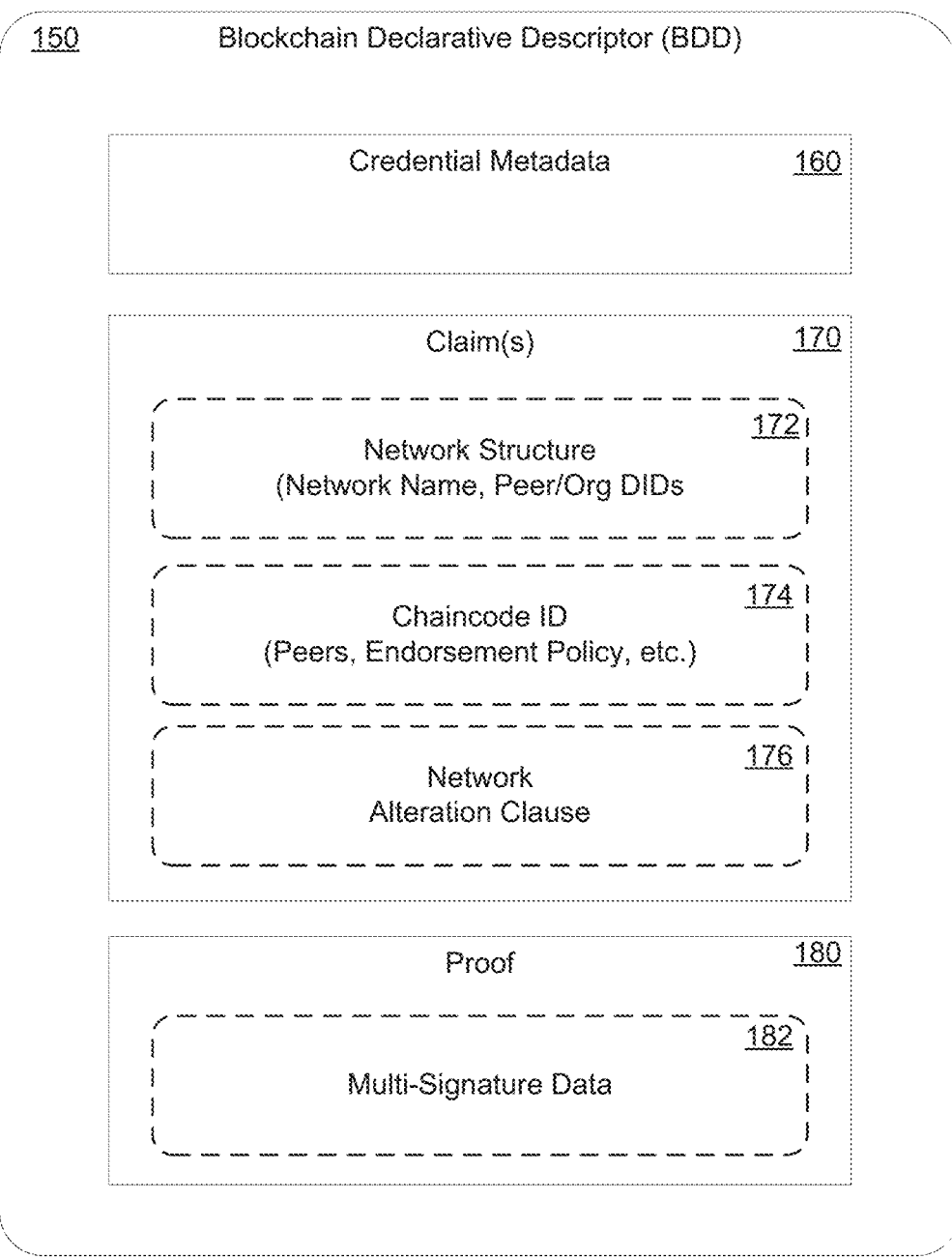
FIG. 1B is a diagram illustrating a blockchain declarative descriptor (BDD) according to example embodiments.

FIG. 1B illustrates an example of a blockchain declarative descriptor (BDD) 150 according to example embodiments. Each of the blockchain networks 101 and 102 may generate their own BDD 150 based on respective network participants. The BDD 150 may be created by any entity with authority to sign on behalf of a blockchain network such as a MSP, a CA, a blockchain peer/smart contract, or the like.

Referring to FIG. 1B, the BDD 150 may include a machine-readable file, code, document, etc., in digital format that includes credential metadata 160, one or more claims 170, and one or more proofs 180 (e.g., signatures) associated with the one or more claims 170. The BDD 150 may include information related to the issuing authority (e.g., CA, MSP, etc.), information about a type of credential, information about specific attributes of the credential, information related to how the credential was derived, information related to constraints on the credential (terms of use, expiration, etc.). The BDD 150 can represent the same information as a physical credential, except that it is in machine-readable format (e.g., JSON, XML, CSV, etc.) rather than human-readable form.

The credential metadata 160 may include data that describes properties of the BDD 150, for example, the issuer, a schema of the verifiable credential (e.g., JSON, XML, CSV, etc.) the expiry date/time, an image of the credential, an identifier of a public key to be used for verification, a revocation mechanism, and the like.

According to various embodiments, the claim field 170 may include a network structure 172 which may include a name of the blockchain network and a list of identifiers of blockchain peers/organizations that are included in the blockchain network associated with the BDD. In some embodiments, the identifiers may include DIDs of the participants, or it may include other information. The network structure 172 may also include an identification of the roles and responsibilities of each of the blockchain peers in the network. For example, the network structure 172 may identify the endorsing peers, etc. The claim field 170 may also include a chaincode field 174 which identifies any chaincodes that are installed and executed by the blockchain peers of the blockchain network, along with identifiers of the blockchain peers that run the chaincode. The claim field 170 may also include an alterations clause 176 which identifies how a new entity of the blockchain network can be added to the BDD 150 or an existing entity can be removed from the BDD 150/blockchain network. For example, the alteration clause 176 may specify a subset of blockchain peers within the blockchain network which must agree/endorse the new peer. Here, a consensus of the endorsing peers (e.g., a quorum, etc.) may be enough to add the new peer.

The proof field 180 may include multi-signature data 182 such as (VCs) of the participants of the blockchain network which have signed over the claims 170. For example, each and every blockchain peer that is a participant of the blockchain network may add a signature (VC) to the proof field 180. As another example, only a predefined peer or subset of peers may add a VC to the proof field 180.

The multi-signature data 182 is a collective assent over the claims 170 made about a blockchain network structure by all organizations participating in the blockchain network.

The proof field 180 may include as proof of asset a verifiable signature on the network structure 172 and the network alteration clause 176, and optionally other claims. Two collection process examples are: (i) a multi-signature scheme whereby counter signatures over the network structure 172 are collected within a single VC. Another example is (ii) an aggregation scheme whereby multiple VCs, each containing the network structure 172 but only a single digital signature (by a given organization) are collected into a single artifact that represents the multi-signature data 180. Either of these processes can be implemented using what is referred to as a flow mechanism whereby one participant creates and signs an artifact and then passes it to another participant for its signature. The signed (or counter-signed) artifacts flow through the set of participants until all required signatures (or in this case, VCs) are collected.

Furthermore, the creation of the BDD 150 is also open to various implementations. One approach is to have a system smart contract (e.g., a smart contract deployed on every network peer) that manages this coordination and collection. The smart contract is executed whenever the blockchain network membership changes and can be triggered by a representative of any participating organization. The network structure containing the current membership information of the blockchain network may be determined and then agreed upon using consensus, along with the new BDD updation clause. These form the claim of VCs that are issued by each participant and submitted to the smart contract. The set of transactions with signatures (called endorsements in Hyperledger Fabric) are collected to form the BDD.

Another example includes a higher layer system application that collects signatures from blockchain network participants off-chain to produce either a multi-signature VC or an aggregation of VCs. Other approaches could involve modifying peers or identity providers (like MSPs in Hyperledger Fabric) to engineer the collection of VCs to form BDDs. The BDD 150 may or may not be stored on a blockchain. If the production mechanism is a smart contract, it will get recorded on-chain as a by-product of the consensus protocol. The BDD's value lies outside the network and is shared with others, stored by each organization (in whatever store an organizational representative uses). It is, however, typically stored in a global BDD Name Registry for discovery or reference.

Referring again to FIG. 1A, the BDD 150 may be stored in the BDD Registry 142, which may be an extension (or extrapolation) of a conventional DID registry 141 that maintains decentralized identity records as well as credential verification information. In some embodiments, the BDD registry 142 (and the DID registry 141) may be a blockchain (shared ledger) network but it does not have to be. As another example, BDDs can also be shared ad hoc by the participant of one network with a participant of another. Here, the sharer may have stored the BDD in its own local store. The receiver can independently validate the BDD by cryptographically validating all the VC signatures within it, and also use standard processes to validate DIDs of the organizations that issue individual VCs. The BDD registry 142 may map a name of the blockchain network to its corresponding BDD. Thus, while the BDD may change over time, the network name does not. Thus, the mapping stays the same.

The BDD described herein enables blockchain networks to be mutually interoperable. The interoperability may manifest itself in the form of data and asset transfers across networks with communication occurring in a peer-to-peer manner (e.g., peer in a first blockchain network and a peer in a second blockchain network). Though protocols for such interoperation exist, they require additional mechanisms to discover, identify, and authenticate networks and their participants. The example embodiments overcome this drawback using a BDD which provides a single credential that can be used to verify any organization/peer of a blockchain network.

As an example, blockchain network A may have heard of a blockchain network B and wishes to communicate/fetch some data from blockchain network B in a trusted manner (involving data and signatures as proof). In this example, an entity in blockchain network A would query the BDD Registry for the BDD of blockchain network B, or otherwise obtain blockchain network B's BDD and then validate it. Once it is validated, the entity in network A can now freely communicate with an entity in network B in some interoperation protocol as it knows who a participant of B is and who is not. Thus, both blockchain networks A and B may be interoperating. However, this interoperation depends on both networks being always aware of the current network structure, which changes with time (participants join and leave). They both can track each other's BDDs and keep this information up-to-date.

Figure 2A:
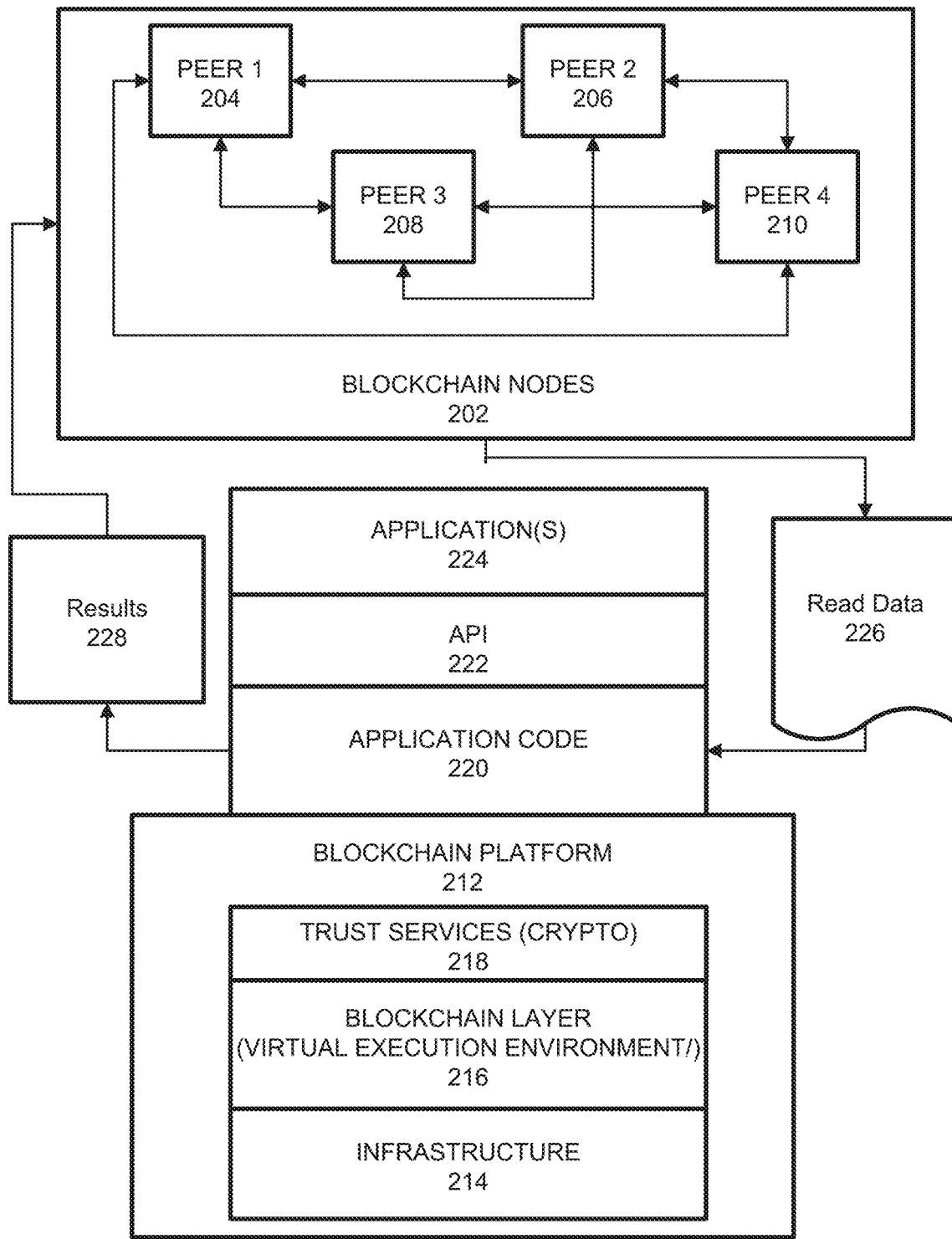
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the smart contract (or chaincode executing the logic of the smart contract) may read blockchain data 226 which may be processed by one or more processing entities (e.g., virtual machines) included in the blockchain layer 216 to generate results 228 including alerts, determining liability, and the like, within a complex service scenario. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract logic which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into one or more blocks within the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation (e.g., the logic) of a smart contract. For example, the chaincode may include a packaged and deployable version of the logic within the smart contract. As described herein, the chaincode may be program code deployed on a computing network, where it is executed and validated by chain validators together during a consensus process. The chaincode may receive a hash and retrieve from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
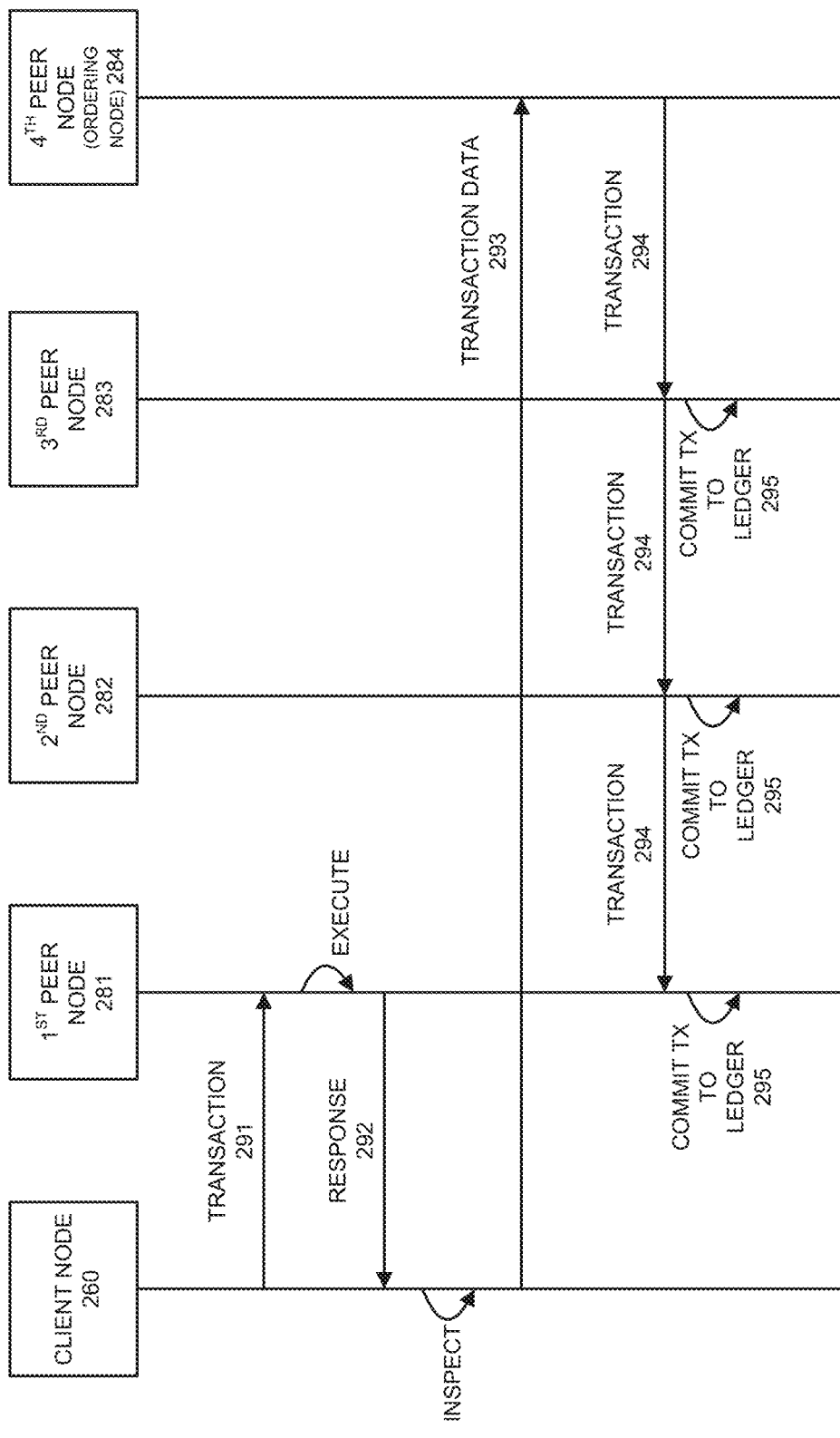
FIG. 2B is a diagram illustrating a blockchain transactional flow among nodes, according to example embodiments.

FIG. 2B illustrates an example of a blockchain transactional flow 250 between nodes of the blockchain in accordance with an example embodiment. Referring to FIG. 2B, the transaction flow may include a client node 260 transmitting a transaction proposal 291 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). Here, the endorsing peer 281 may determine whether or not to endorse the transaction proposal. The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the signatures of the endorsing peers and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction proposal and broadcasts the transaction proposal and response within a transaction message to the ordering node 284. The transaction may contain the read/write sets, the endorsing peer signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks are delivered from the ordering node 284 to all peer nodes 281-283 on the channel. The data section within the block may be validated to ensure an endorsement policy is fulfilled and to ensure that there have been no changes to ledger state for read set variables since the read set was generated by the transaction execution. Furthermore, in step 295 each peer node 281-283 appends the block to the channel's chain, and for each valid transaction the write sets are committed to current state database. An event may be emitted, to notify the client application that the transaction (invocation) has been immutably appended to the chain, as well as to notify whether the transaction was validated or invalidated.

In the example of FIG. 2B, the client node 260 and each of the blockchain peers 281-284 may use a verifiable credential as a signature. As the transaction moves through the different steps of FIG. 2B, each of the client node 260 and the blockchain peers 281-284 may attach their respective VC to a step that they have performed. In this example, each of the blockchain peers 281-284 may include a set of VCs (e.g., one or more VCs) that provide identity and membership information associated with the blockchain peers 281-284. For example, the client node 260 may include a verifiable certificate with a claim issued by a MSP of the blockchain network that identifies the client as a member for transacting on the blockchain. As another example, the blockchain peers 281-283 may include VCs that identify the blockchain peers 281-283 as endorsing peers of the blockchain. Meanwhile, the blockchain peer 284 may include a VC that identifies the blockchain peer 284 as an ordering node of the blockchain. Many other VCs are possible. For example, particular channels on the blockchain (e.g., different blockchains on the same ledger) may require different VCs in order to serve as a client, a peer, an endorser, and orderer, and the like. As another example, different types of transactions and/or chaincodes may require a separate VC by the clients, the peers, etc. For example, a client may only submit a transaction to invoke a particular chaincode if the client has a VC identifying the client has authority to use such chaincode.

Figure 3A:
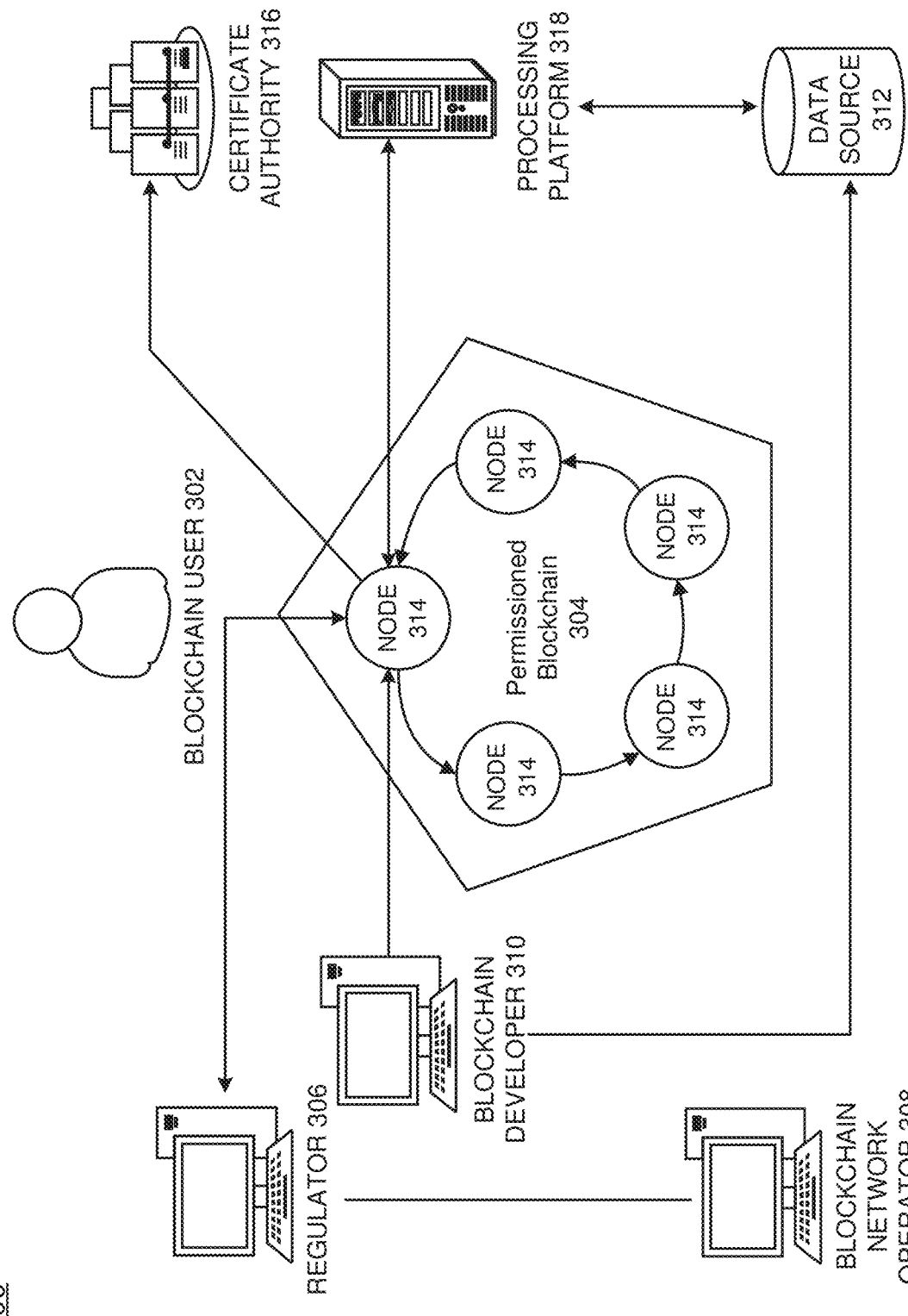
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
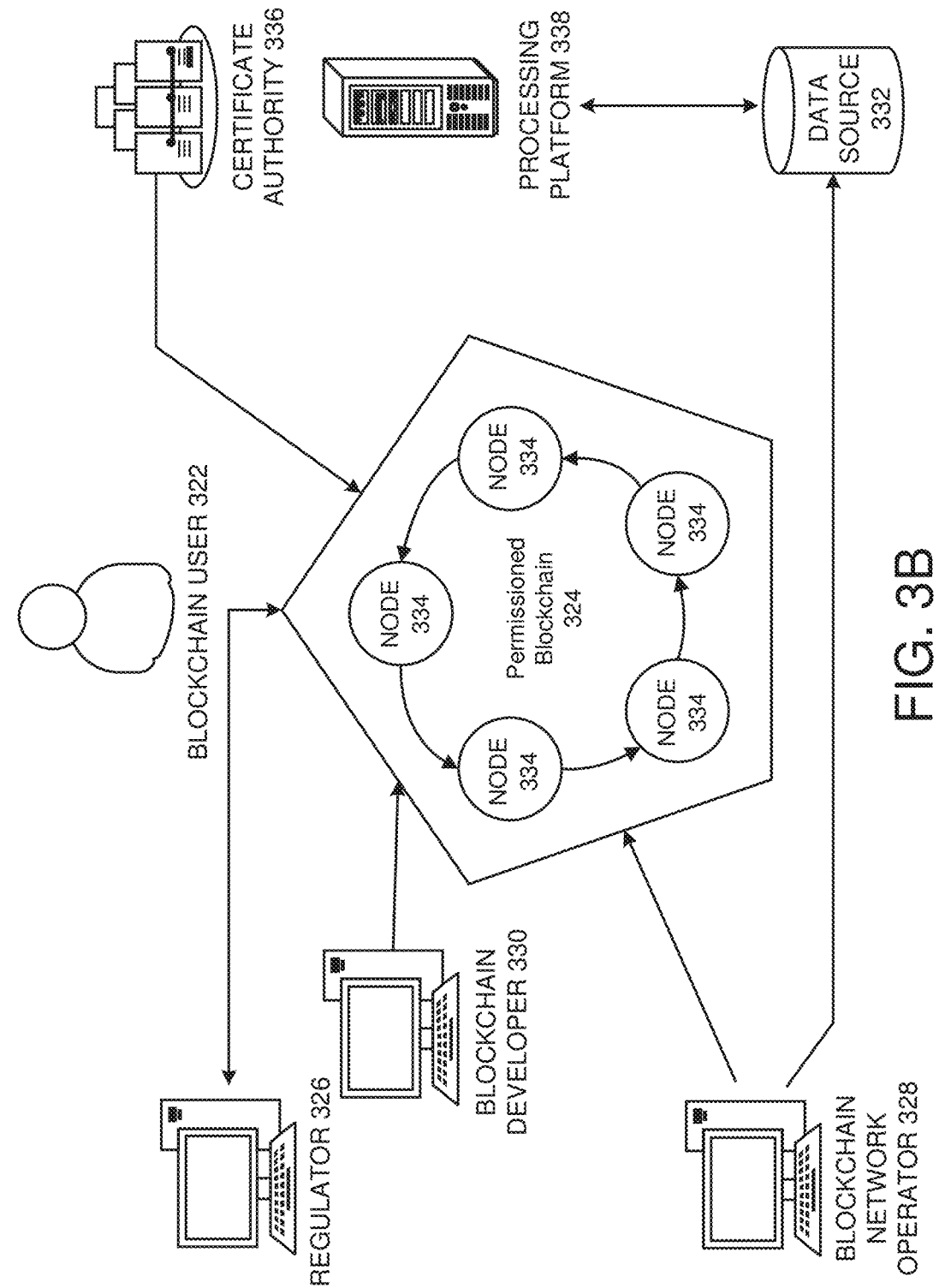
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
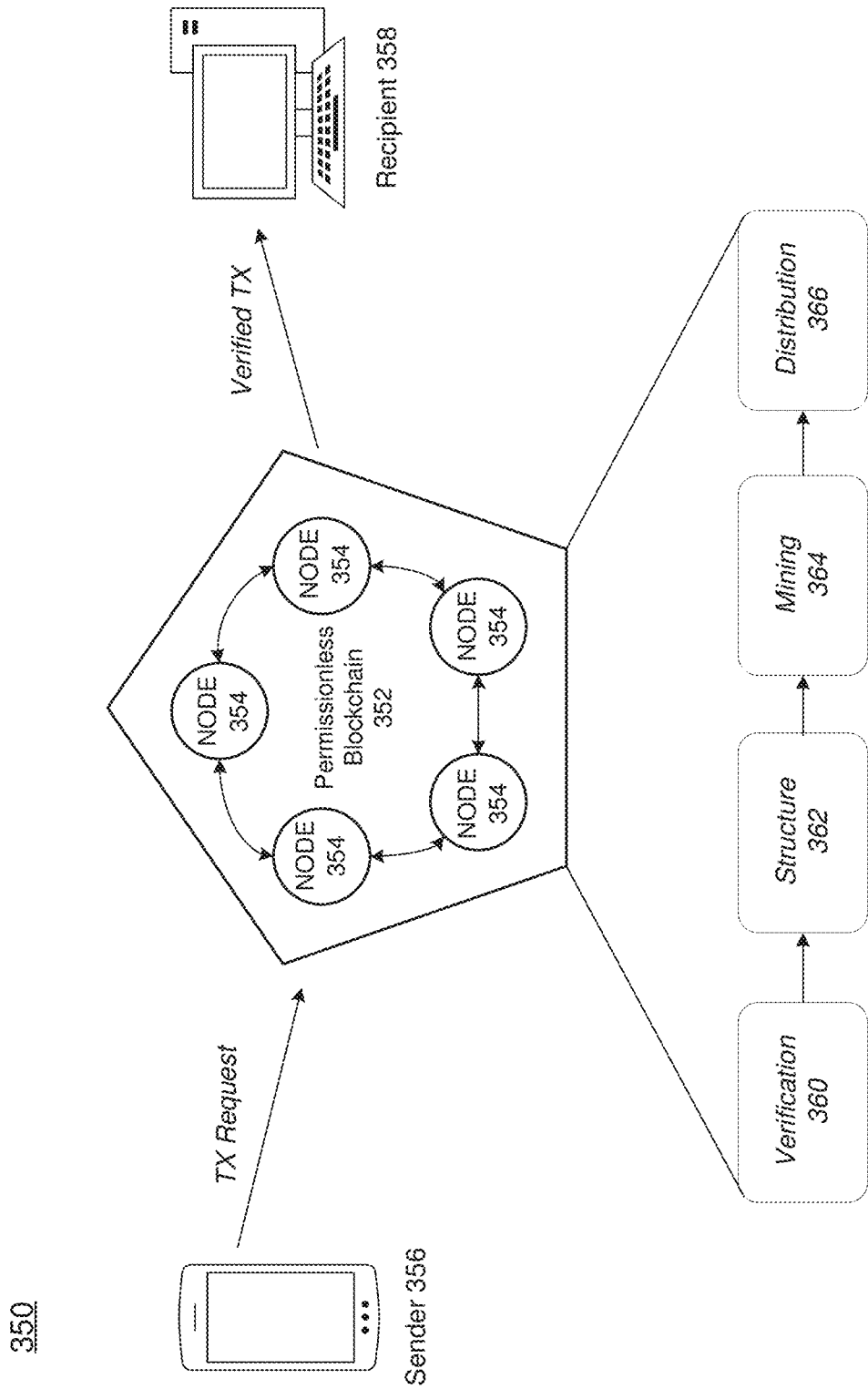
FIG. 3C is a diagram illustrating a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

In the example embodiments, a verifiable Credential (VC) such as BDD extends DID, is tamper-evident, and provides a verifiable set of claims made by an issuer. A verifiable presentation (VP) may be derived from VC(s)—to present specific credential(s) attributes that are shared with specific verifier. In some embodiments, a VC may contain data synthetized from the original credential (e.g., zero knowledge proofs, etc.) The network registry may be interacted with by a verifier to obtain information for validating a BDD. For example, the verifier may provide the name of the network to the network registry and receive a corresponding BDD in response. The registry mediates the creation and verification of identities, credential schemas, etc. The DIDs of the network participants may also be included in the BDD. DIDs may be used to identify blockchain network components. In private blockchain networks (Fabric, Corda, etc.) clients as well as all active components may have DID identities. In Fabric peers and orderers have DID identities.

The network registry can be hosted within an external network, and in some embodiments, may include a blockchain network where the network registry is stored on a distributed ledger. The external network can serve as an identity network for multiple networks, serving as a bridge (or mediator) for inter-network exchanges. The external network allows unified and simplified identity management across organization(s) or large ecosystem. This identity mechanism allows for an overall external network-based configuration management mechanism.

Figure 4A:
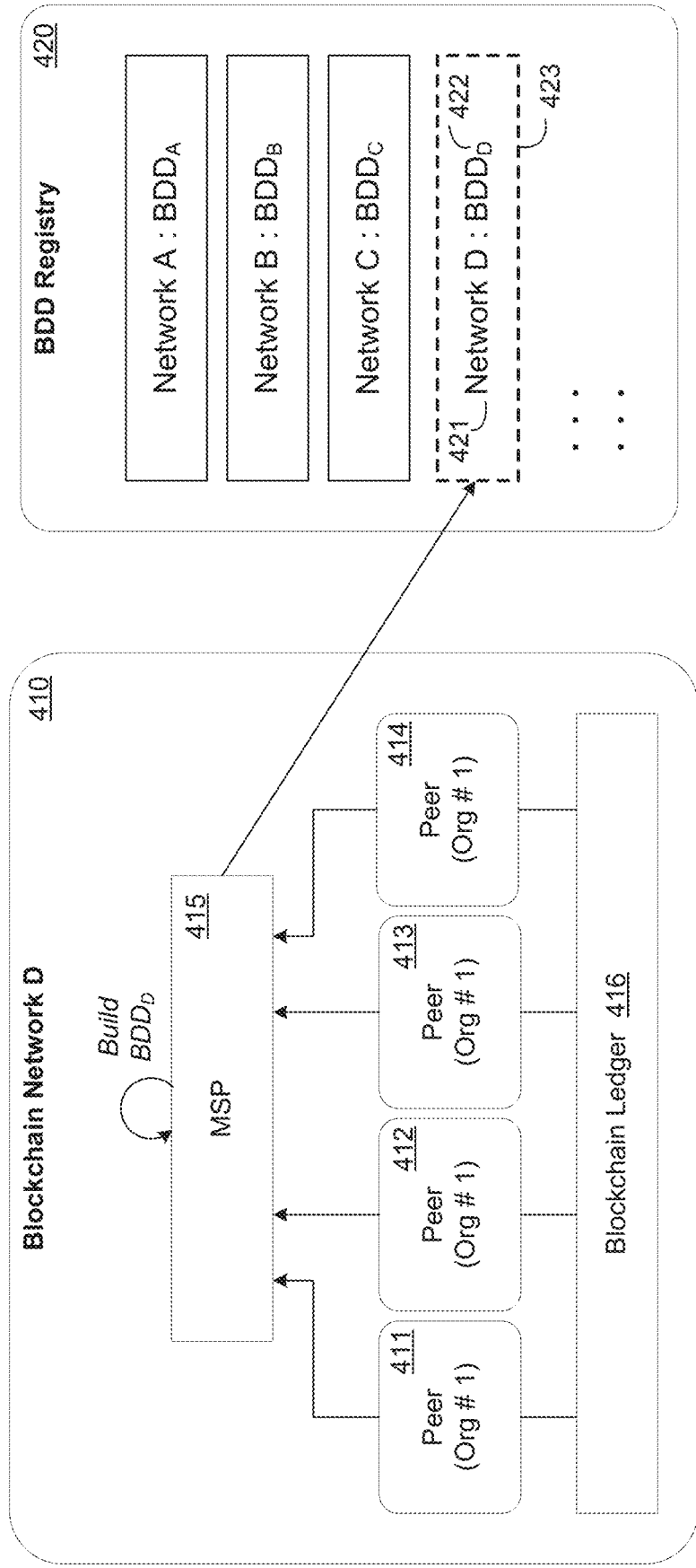
FIG. 4A is a diagram illustrating a process of generating a BDD based on blockchain organization information according to example embodiments.

FIG. 4A illustrates a process 400A of generating a BDD based on blockchain organization information according to example embodiments. Referring to FIG. 4A, a BDD is created for a blockchain network 410 represented as "blockchain network D". In this example, the blockchain network 410 includes four blockchain peers 411, 412, 413, and 414, which each co-manage a blockchain ledger 416. Furthermore, each of the blockchain peers 411-414 have their own DID assigned thereto. In this example, a membership service provider (MSP) 415 of the blockchain network 410 may request the DIDs from the blockchain peers 411-414 and store the DIDs in a network structure of the claim field of the BDD. The MSP 415 may also request VCs of the blockchain peers 411-414 (which include signature data), and store the VCs within the proof field of the BDD. Furthermore, the MSP 415 may add metadata about the blockchain network 410 to the metadata field. The resulting BDD D that is built/constructed by the MSP 415 may be transmitted to a BDD registry 420 where it is stored as an entry 423 with a network name value 421 and a BDD value 422.

It should also be appreciated that the BDD D may be constructed by a number of different entities. For example, the BDD D may be constructed by a blockchain peer with a smart contract running therein for collecting the DIDs and signature data (VCs). As another example, the BDD D may be built by a CA or other trusted entity. In some embodiments, the MSP or the CA may not be dedicated to the particular network.

Figure 4B:
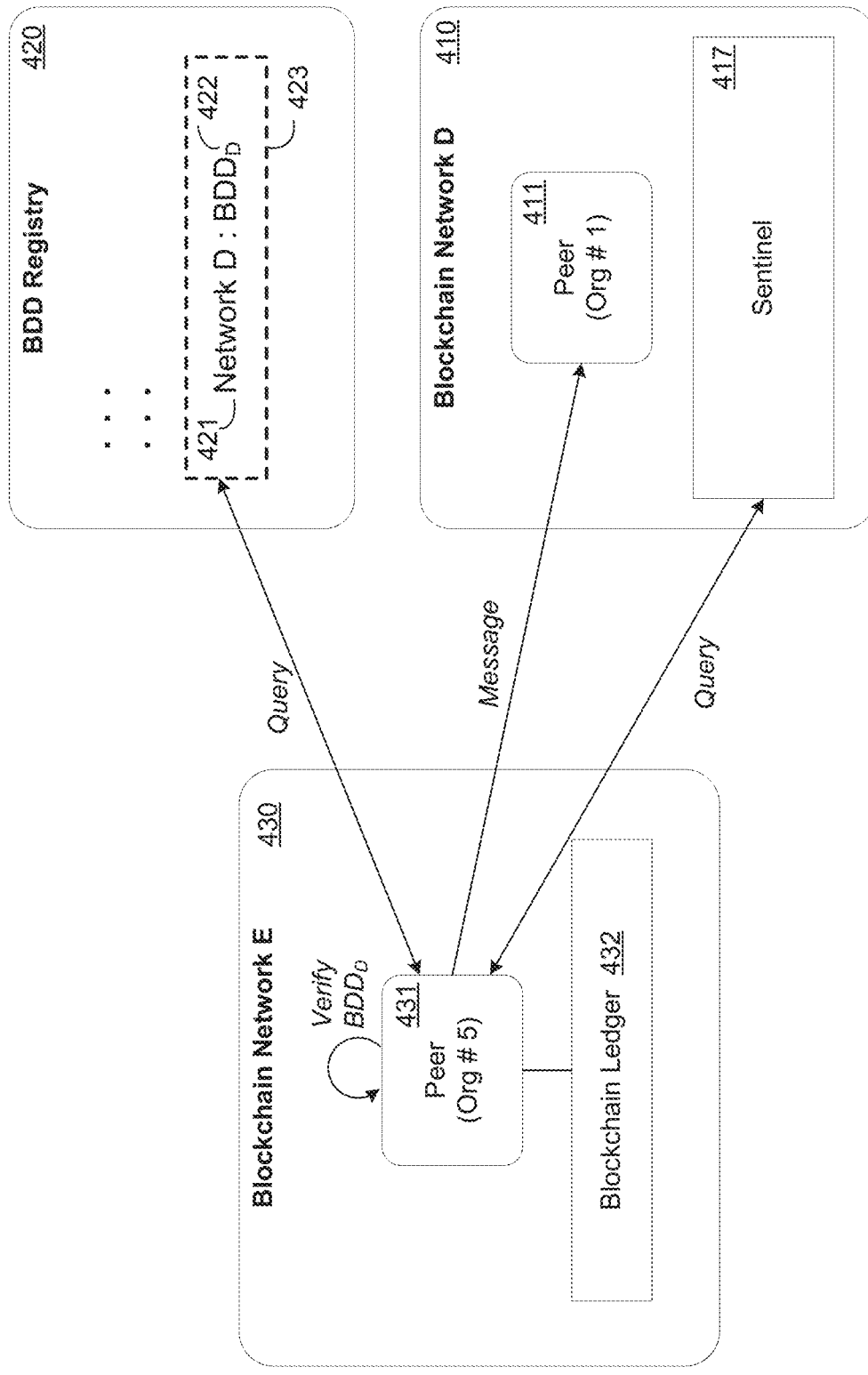
FIG. 4B is a diagram illustrating a process of verifying a BDD and performing an inter-network communication according to example embodiments.

FIG. 4B illustrates a process 400B of verifying a BDD and performing an inter-network communication according to example embodiments. Referring to FIG. 4B, a blockchain peer 431 that manages a blockchain ledger 432 in blockchain network 430 (blockchain network E), desires to communicate with blockchain peer 411 in blockchain network 410 (blockchain network D). To verify that the blockchain peer 411 is a valid member of the blockchain network 410, the blockchain peer 431 may query the BDD registry 420 for the BDD 422. For example, the blockchain peer 431 may transmit a network name (network D) of the blockchain network 410 to the BDD registry 420. In response, the BDD registry 420 may identify the corresponding BDD 422 mapped to the network name 421 in an entry 423 of the BDD registry 420, and provide the BDD 422 to the blockchain peer 431 in the blockchain network 430.

The blockchain peer 431 may also query the blockchain network 410 for information about the blockchain peer 411. In this case, the blockchain peer 431 may query a sentinel 417 which is a dedicated endpoint for providing network information about the blockchain network 410. Here, the sentinel 417 may provide some information about the blockchain network 410, such as the DID of the blockchain peer 411, or a list of DIDs of all blockchain peers of the blockchain network 410, without providing any other network information such as the network structure, chaincode, etc.

In response to receiving both the BDD 422 from the BDD registry 420 and the network information from the sentinel 417, the blockchain peer 431 may verify that the DID of the blockchain peer 411 received from the sentinel 417 is included in the list of DIDs in the network structure of the BDD 422. The blockchain peer 431 may also verify that a VC of the blockchain peer 411 is included in the proof section of the BDD 422. Upon confirming these attributes, the blockchain peer 431 may perform an inter-network communication with blockchain peer 411 such as messaging, transacting, and the like.

Figure 5A:
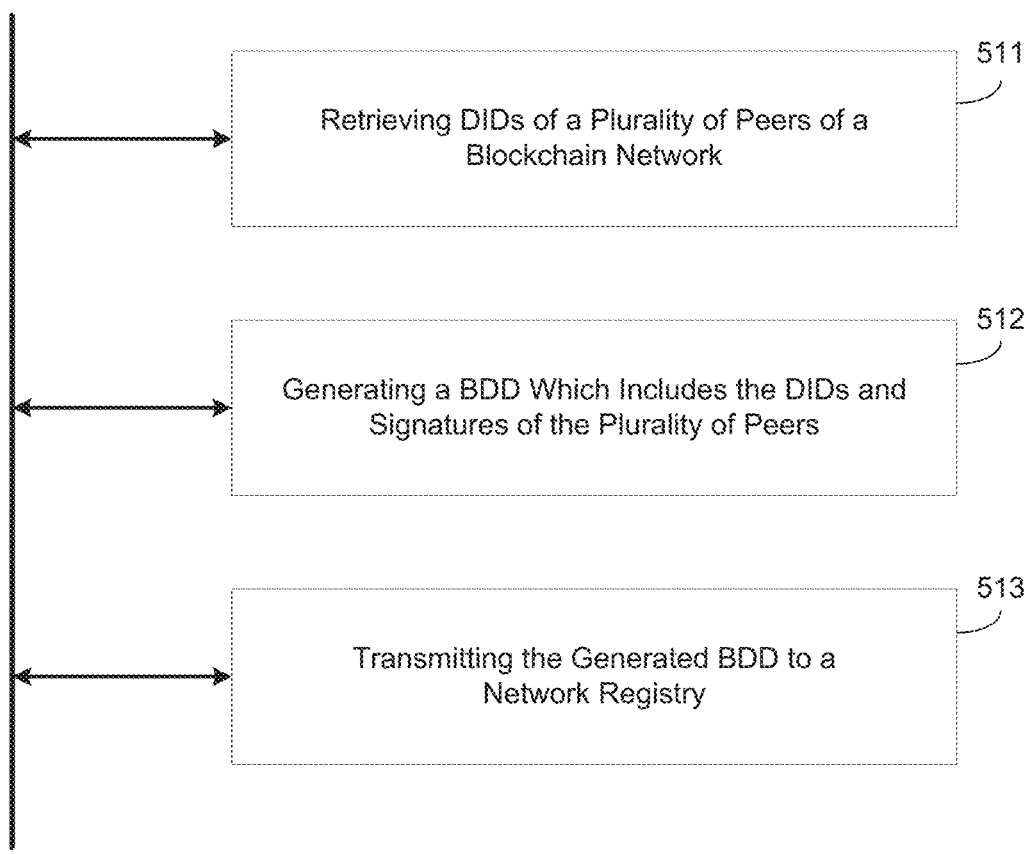
FIG. 5A is a diagram illustrating a method of generating a blockchain declarative descriptor according to example embodiments.

FIG. 5A illustrates a method 510 of generating a blockchain declarative descriptor according to example embodiments. As a non-limiting example, the method 510 may be performed by an entity in a blockchain network such as a blockchain peer (smart contract), a MSP, a CA, a combination of entities, and the like. Referring to FIG. 5A, in 511, the method may include retrieving decentralized identifiers (DIDs) of a plurality of blockchain peers included within a blockchain network. For example, the DIDs may be assigned by an SSI network or other DID-based entity. Each DID may uniquely represent a different network component (e.g., peer, orderer, client, etc.) of the blockchain network. In 512, the method may include generating a blockchain declarative descriptor (BDD) which uniquely identifies the blockchain network, where the BDD comprises a machine-readable data file with a first field includes the retrieved DIDs of the blockchain network, a second field including signatures of the plurality of blockchain peers, and a third field including metadata. The signatures may include verifiable credentials (VCs) that have been generated for the plurality of blockchain peers based on their respective DIDs. In 513, the method may include transmitting the generated BDD to a blockchain network registry where the BDD can be stored and accessible to other blockchain networks.

In some embodiments, the method may further include receiving a document that has been signed by each of the plurality of blockchain peers of the blockchain network, and storing the document within the second field of the BDD. In some embodiments, the method may include receiving a plurality of signed documents from the plurality of blockchain peers, respectively, where each document is signed by a different blockchain peer, and storing the plurality of documents within the second field of the BDD. In some embodiments, the method may include storing a blockchain network updation descriptor within the first field of the BDD including the network structure. In some embodiments, the method may further include receiving via a sentinel installed in the blockchain network, a request for the BDD of the blockchain network from a blockchain peer of a second network.

In some embodiments, the method may further include transmitting via the sentinel installed in the blockchain network, the DIDs of the plurality of blockchain peers included in the first field of the BDD without the metadata in the third field of the BDD. In some embodiments, the method may further include detecting a new blockchain peer within the blockchain network, and updating the first field of the BDD to include the DID of the new blockchain peer and the second field to include a signature of the new blockchain peer. In some embodiments, the method may further include identifying a chaincode installed within the blockchain network, and storing a name of the chaincode within the first field of the BDD.

Figure 5B:
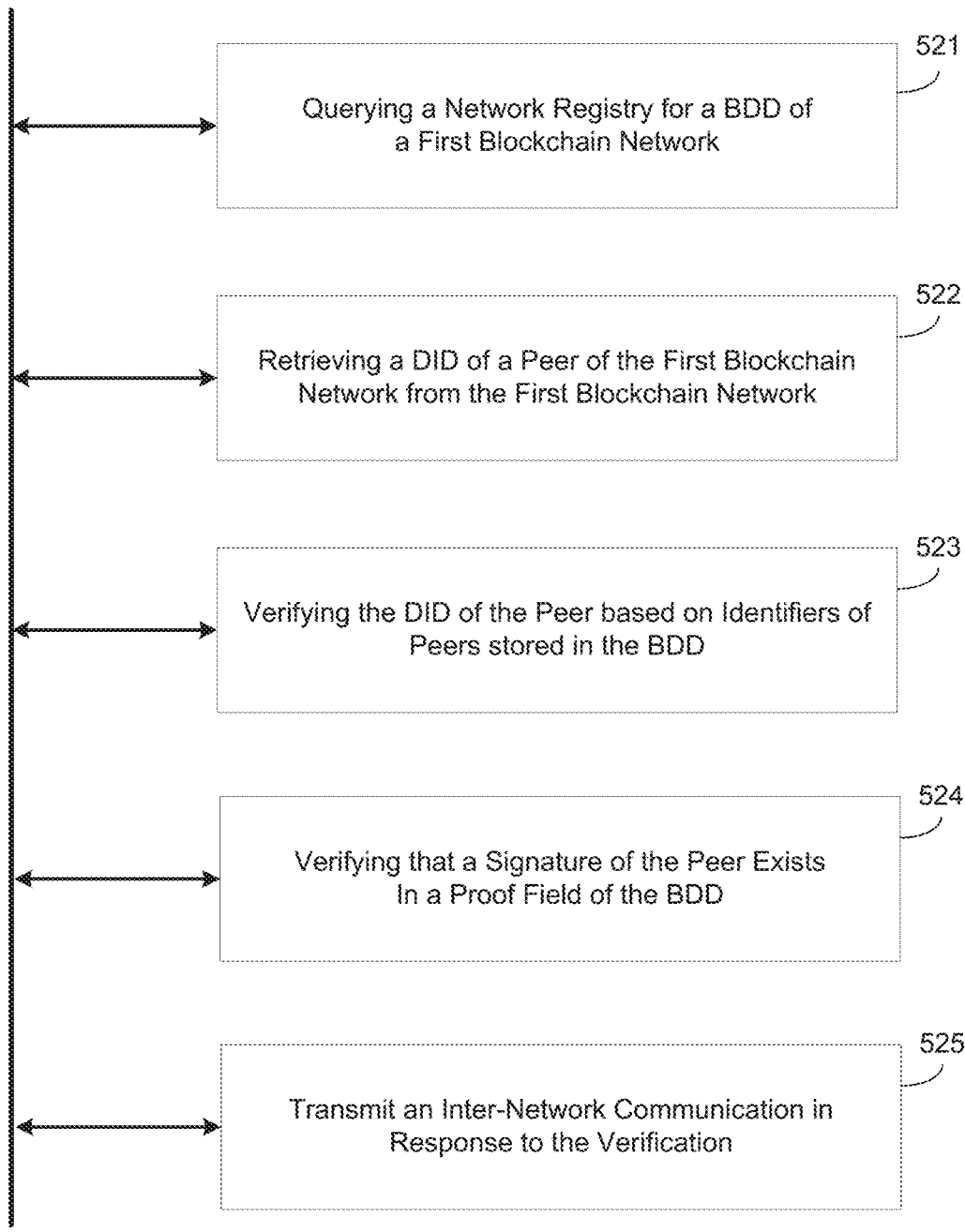
FIG. 5B is a diagram illustrating a method verifying a BDD and performing an inter-network communication according to example embodiments.

FIG. 5B illustrates a method 520 of verifying a BDD and performing an inter-network communication according to example embodiments. For example, the method 520 may be performed by an entity in a blockchain network such as a blockchain peer, a client, an ordering node, and the like. Referring to FIG. 5B, in 521, the method may include querying a network registry for a blockchain declarative descriptor (BDD) of a first blockchain network, the BDD including a network structure and identifiers of a plurality of peers of the first blockchain network. In 522, the method may include retrieving a decentralized identifiers (DID) from the first blockchain network. Here, the DIDs may uniquely represent an entity of the first blockchain network such as a blockchain peer, and the like.

In 523, the method may include verifying the DID of the entity based on the BDD of the first blockchain network. For example, the verifying may include comparing the retrieved DID to the DIDs included in the BDD to verify that the DID exists in the BDD. In 524, the method may include verifying that a signature (e.g., a verifiable credential, etc.) of the entity exists in the proof field of the BDD. In response to successful verifications in 523 and 425, in 525, the method may include transmitting an inter-network communication from a peer in first blockchain network to a peer in second blockchain network.

In some embodiments, the retrieving may include probing a sentinel installed within the first blockchain network for the DIDs. In some embodiments, the network registry may include a database of entries, where each entry includes a name of a blockchain network paired with a respective BDD of the blockchain network. In some embodiments, the BDD may include a machine-readable data file with a first field including the network structure, a second field including signatures of the plurality of peers, and a third field including metadata.

Figure 6A:
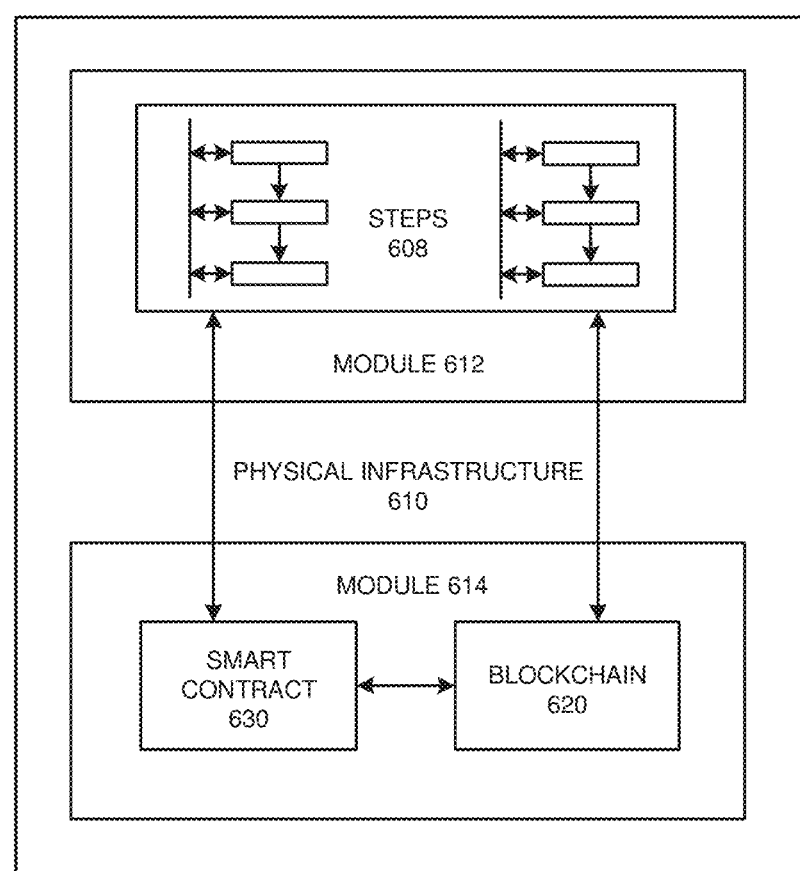
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
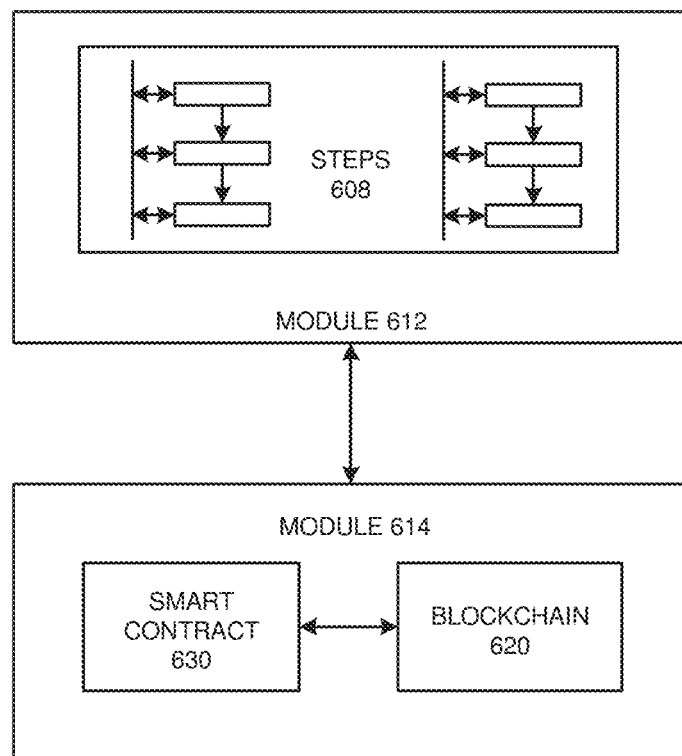
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
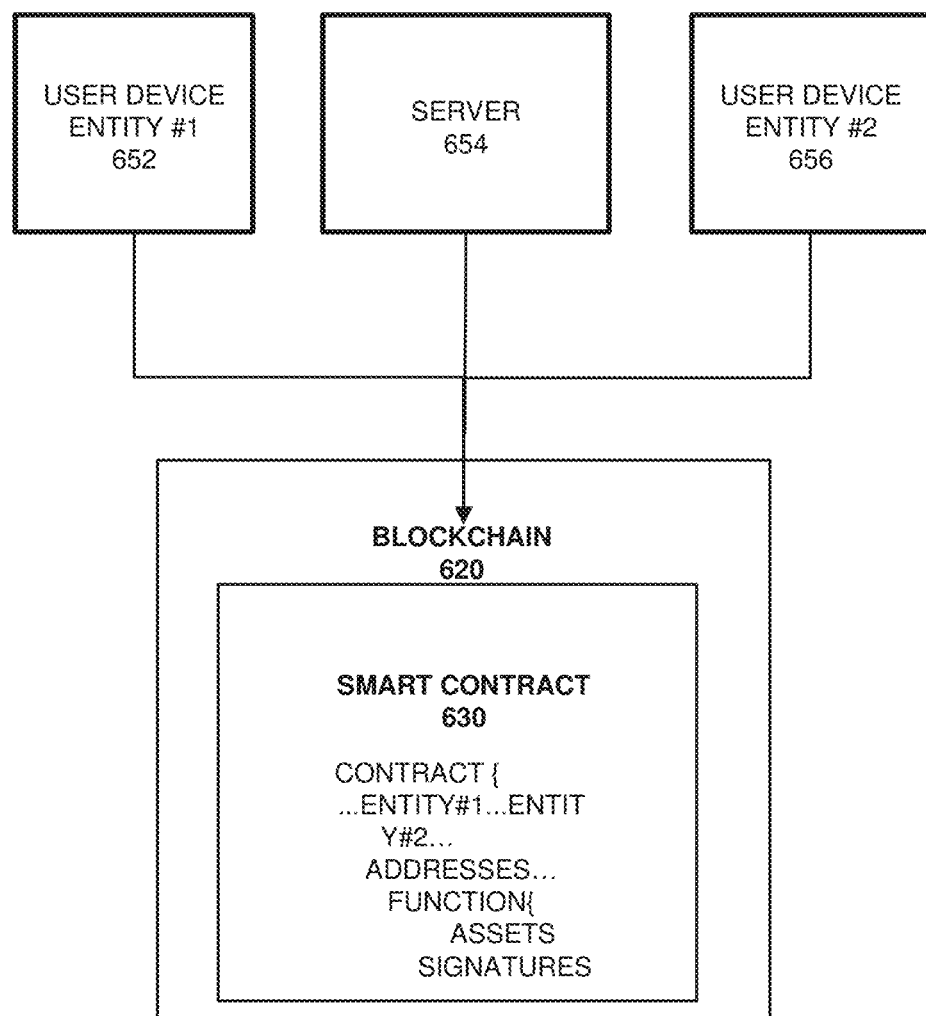
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
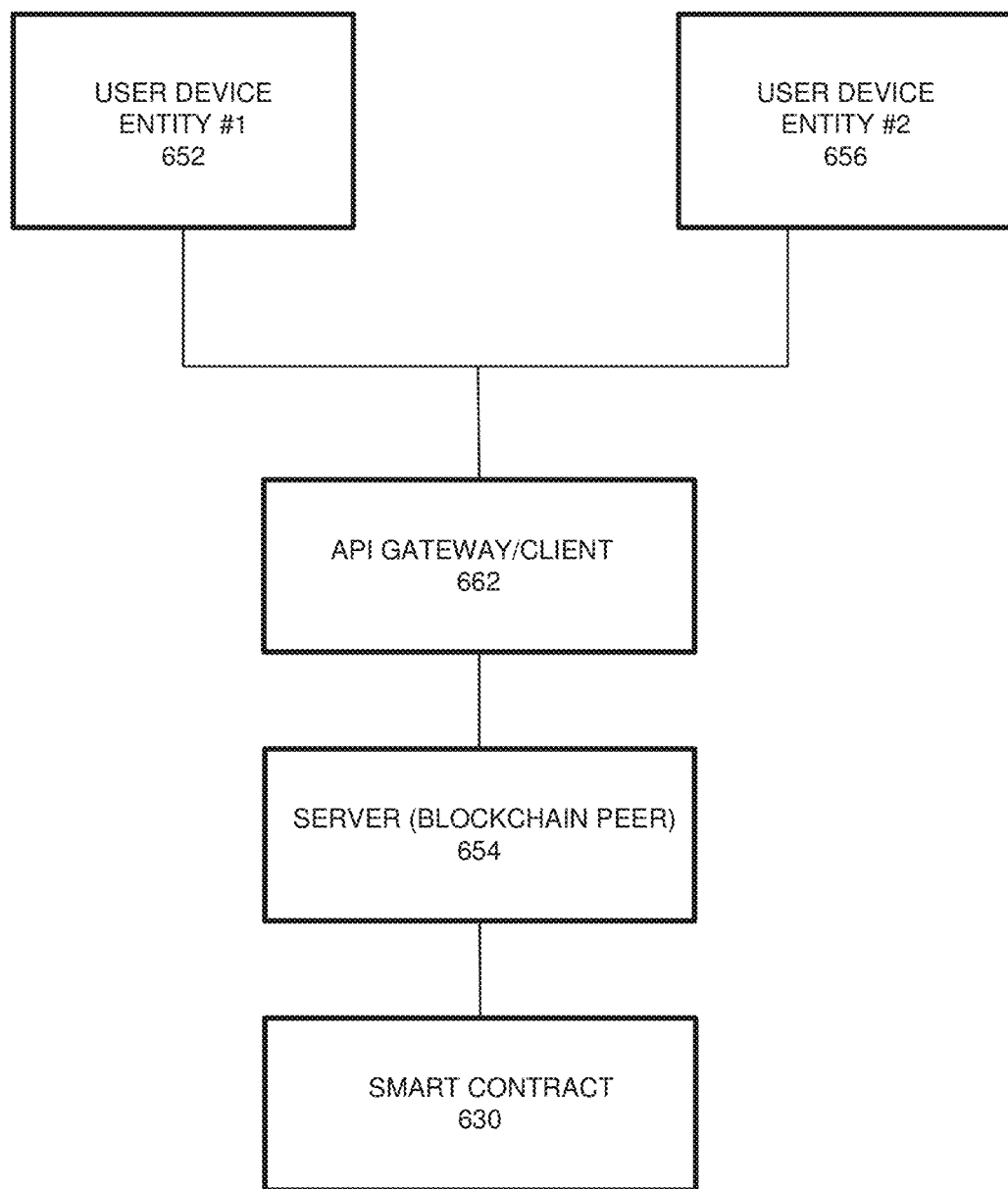
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
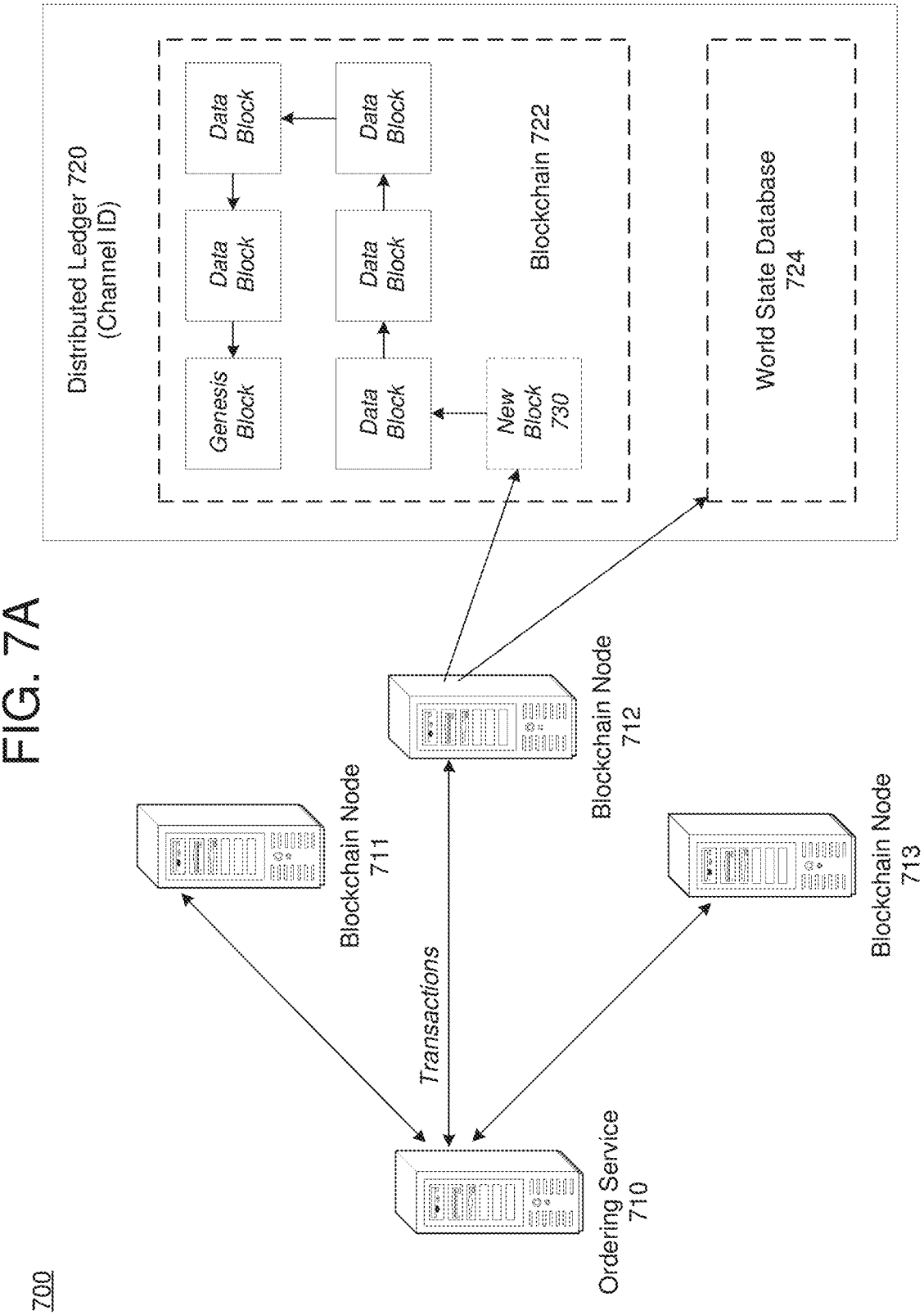
FIG. 7A is a diagram illustrating a process of a new block being added to a distributed ledger, according to example embodiments.
Figure 7B:
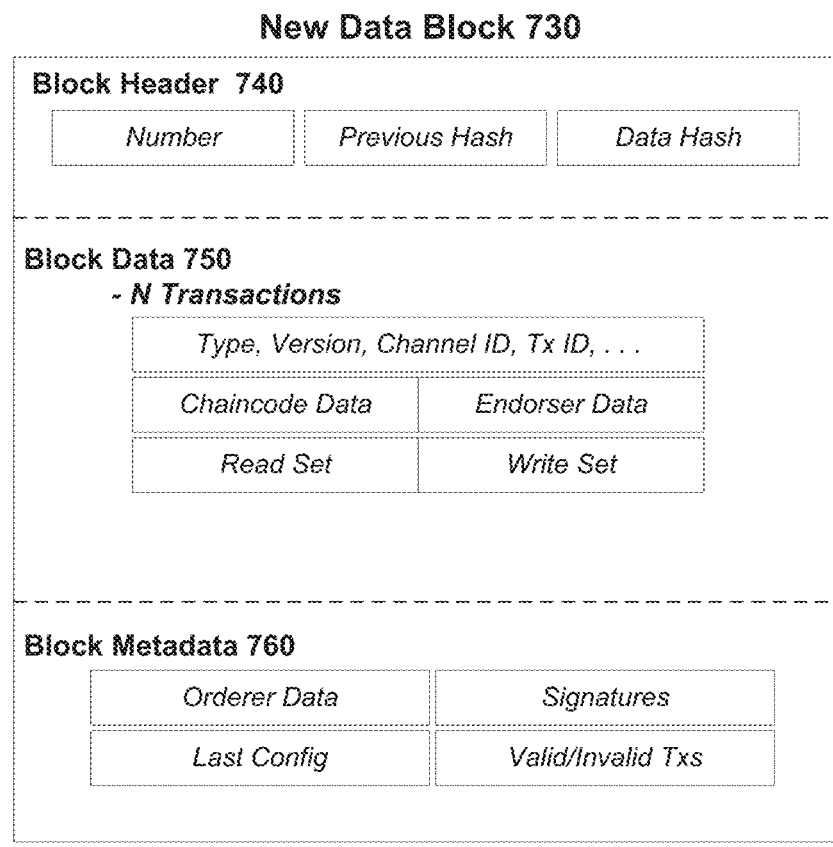
FIG. 7B is a diagram illustrating data contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/ peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750 (block data section), and block metadata 760. It should be appreciated that the various depicted blocks and their contents, such as new data block 730 and its contents, shown in FIG. 7B are merely examples and are not meant to limit the scope of the example embodiments. In a conventional block, the data section may store transactional information of N transaction(s) (e.g., 1, 10, 100, 500, 1000, 2000, 3000, etc.) within the block data 750.

The new data block 730 may include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions that are included in the block data 750 and a validation code identifying whether a transaction was valid/invalid.

Figure 7C:
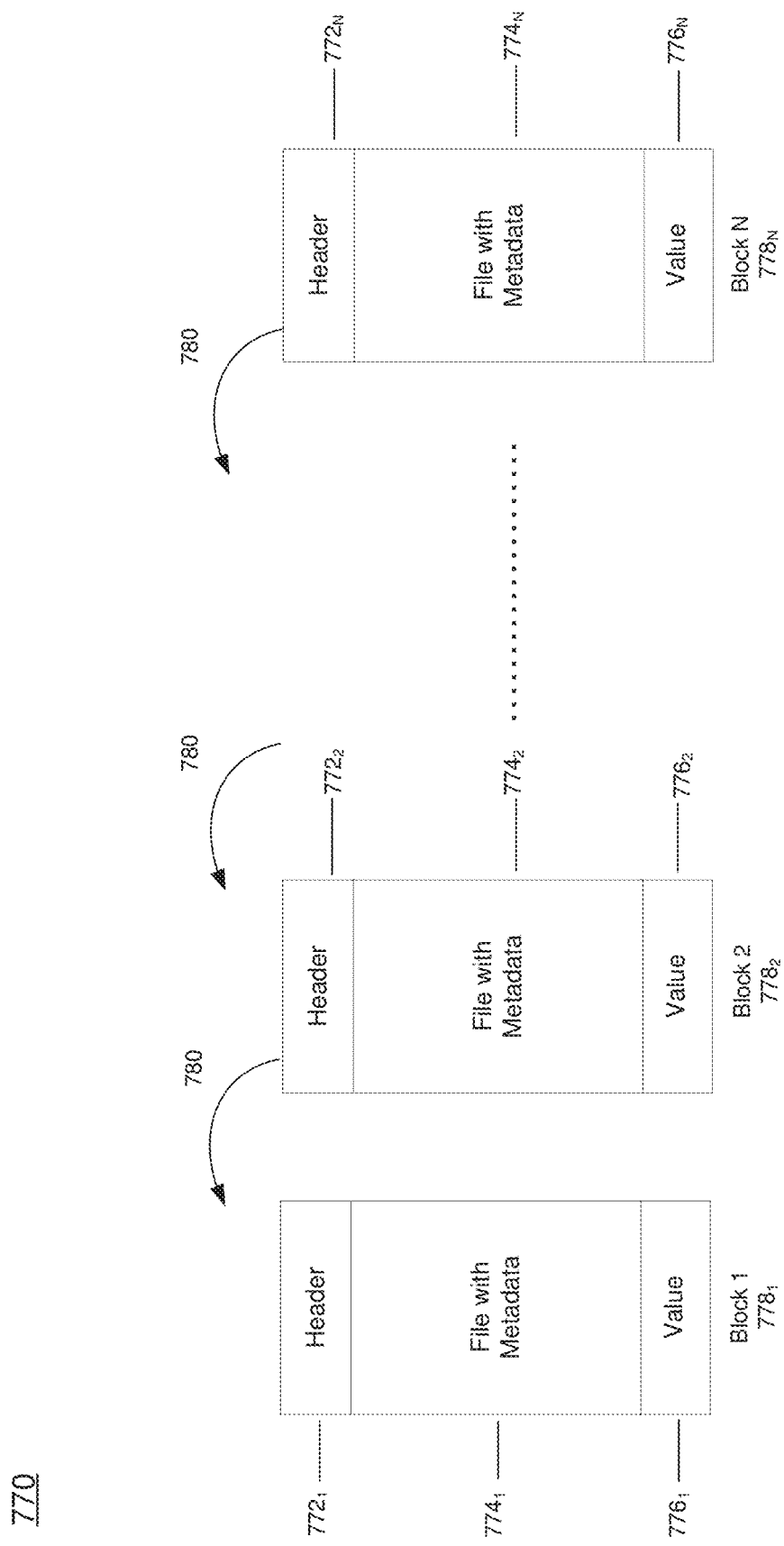
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 7C, the blockchain 770 includes a number of blocks $778_1, 778_2, \ldots 778_N$ cryptographically linked in an ordered sequence, where $N \geq 1$. The encryption used to link the blocks $778_1, 778_2, \ldots 778_N$ may be any of a number of keyed or un-keyed Hash functions. In one embodiment, the blocks $778_1, 778_2, \ldots 778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
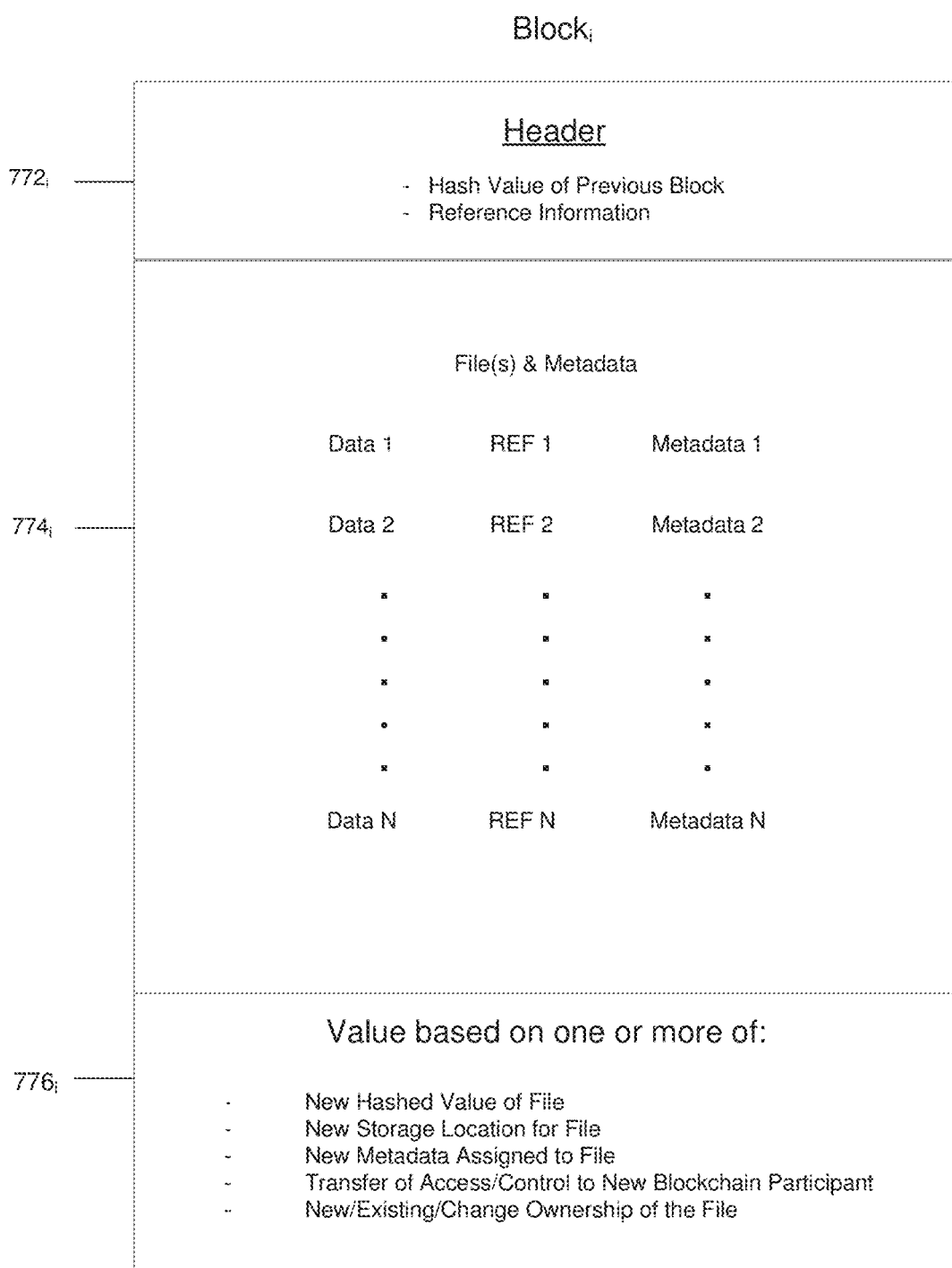
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file d) transfer of access or control of the file from one blockchain participant to another blockchain participant FIG. 7D illustrates an embodiment of a block which may represent the structure of the blocks in the blockchain 790 in accordance with one embodiment. The block, Block$_i$, includes a header 772$_i$, a file 774$_i$, and a value 776$_i$.

The header 772$_1$ includes a hash value of a previous block Block$_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file 774$_1$ includes a plurality of data, such as Data 1, Data 2, ..., Data N in sequence. The data are tagged with Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF$_1$, REF$_2$, ..., REF$_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value 776$_i$ is a hash value or other value computed based on any of the types of information previously discussed. For example, for any given block Block$_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last (N$^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
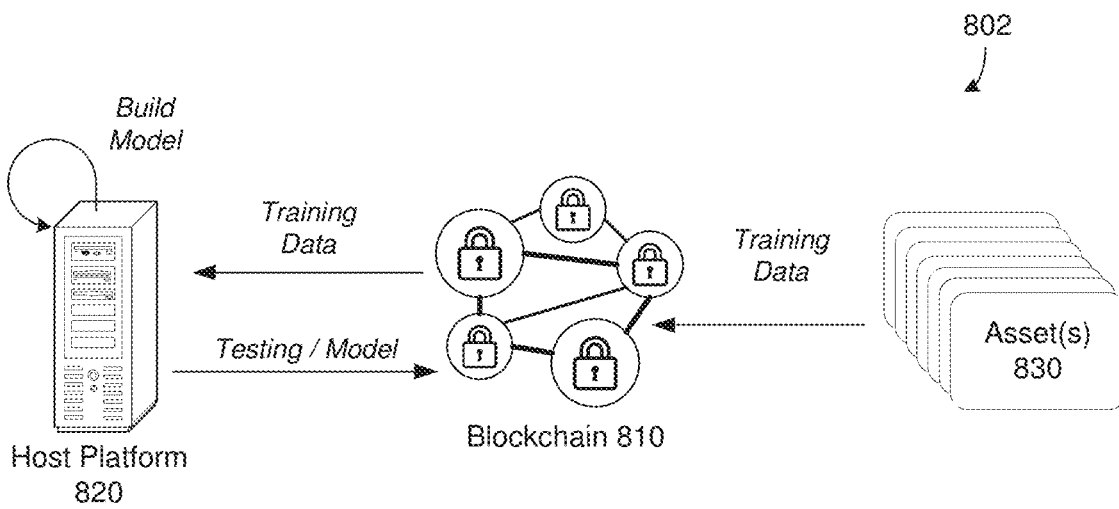
FIG. 8A is a diagram illustrating an example blockchain which stores machine learning (artificial intelligence) data, according to example embodiments.
Figure 8A:
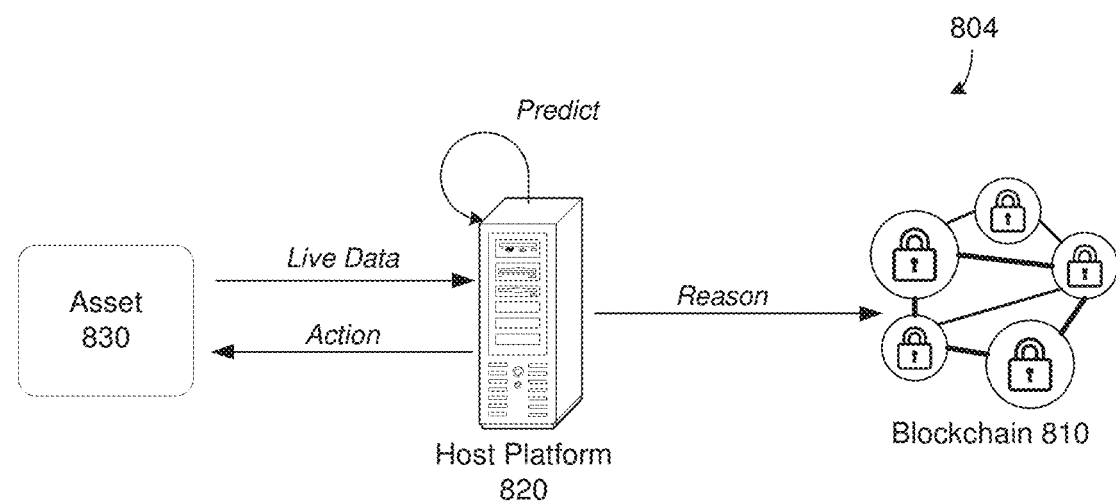
Figure 8B:
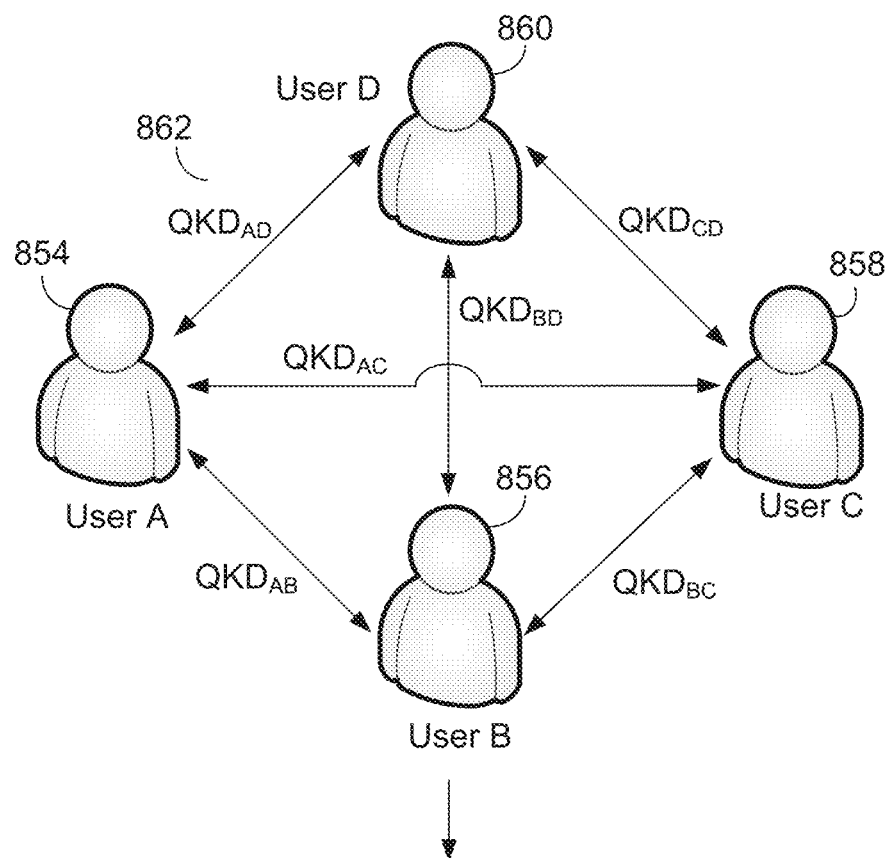
FIG. 8B is a diagram illustrating an example quantum-secure blockchain, according to example embodiments.
Figure 8B:
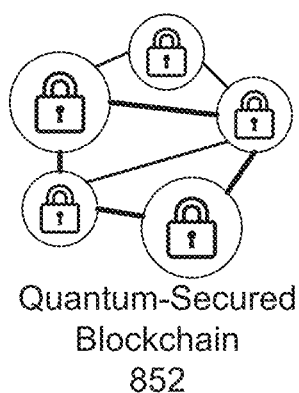

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model.

In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
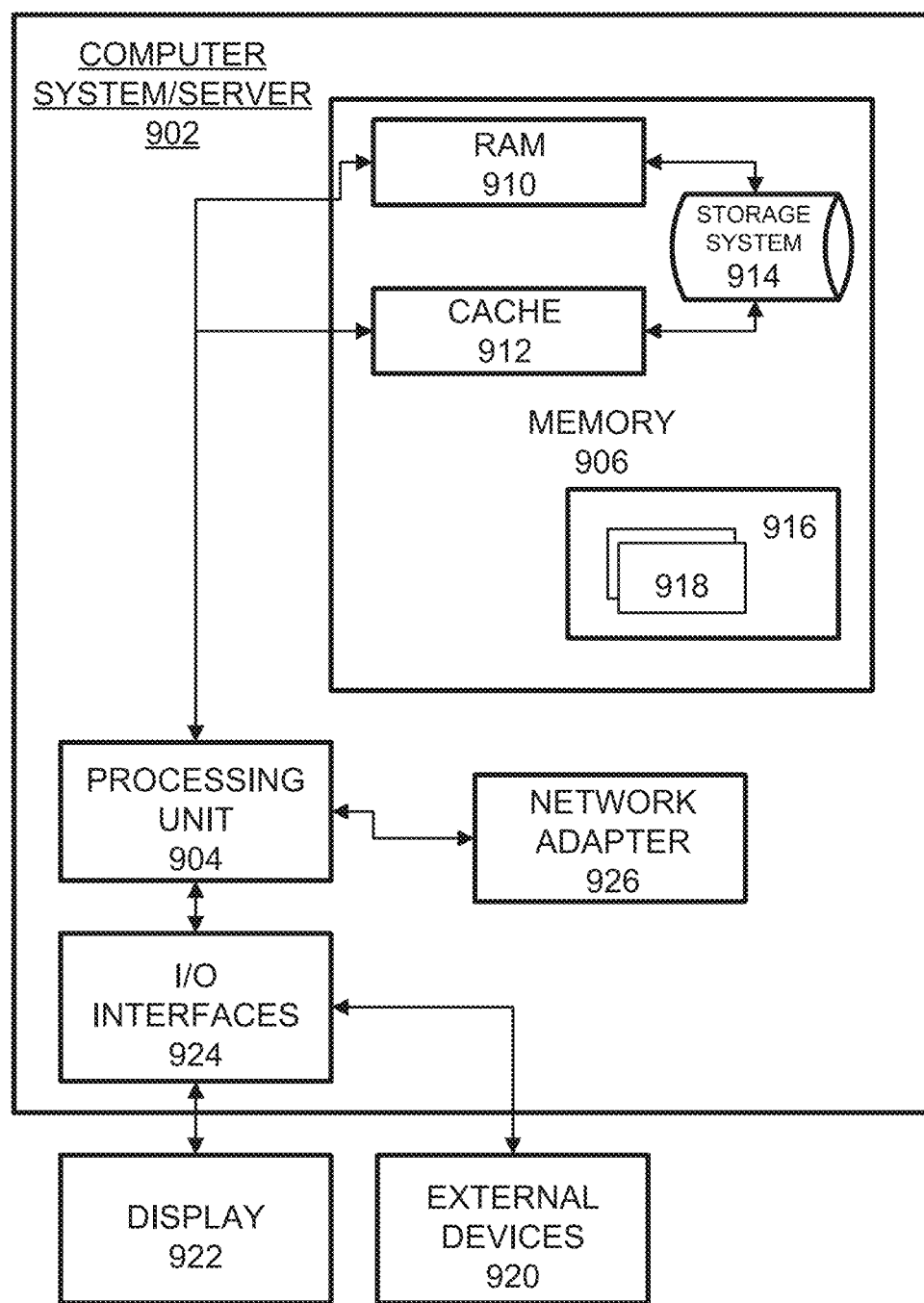
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a processor configured to generate a single verifiable credential (VC) for an entire blockchain in a blockchain network, wherein the processor is configured to:
   retrieve decentralized identifiers (DIDs) of all of the blockchain peers included within the blockchain network;
   generate a blockchain declarative descriptor (BDD) that uniquely identifies the blockchain network, the BDD comprising:
   a first field including the DIDs,
   a second field that includes combined signature data of all of the blockchain peers, and
   a third field that includes metadata;
   transmit the BDD to a blockchain network registry;
   receive a single document that all of the blockchain peers have signed;
   store the single document within the second field of the BDD; and
   utilize the VC to prove that a blockchain peer, of all of the blockchain peers, participates within the blockchain network.

2. The apparatus of claim 1, wherein the processor is further configured to:
   receive a plurality of documents from corresponding ones of the plurality of blockchain peers, where each document, of the plurality of documents, is signed by a different corresponding blockchain peer; and
   store the plurality of documents within the second field of the BDD.

3. The apparatus of claim 1, wherein the processor is further configured to:
   store a blockchain network updation descriptor within the first field of the BDD.

4. The apparatus of claim 1, wherein, when the processor retrieves the DIDs, the processor is further configured to:
   retrieve the DIDs from a registry that stores a mapping between a unique identifier of a blockchain peer and a corresponding DID of that blockchain peer.

5. The apparatus of claim 1, wherein the blockchain network registry maps a name of the blockchain network to its corresponding BDD.

6. The apparatus of claim 1, wherein the processor is further configured to:
   detect a new blockchain peer within the blockchain network;
   update the first field of the BDD to include a DID of the new blockchain peer; and
   update the second field to include a signature of the new blockchain peer.

7. The apparatus of claim 1, wherein the processor is further configured to:
   identify a chaincode installed within the blockchain network; and
   storing a name of the chaincode within the first field of the BDD.

8. A method for generating a single verifiable credential (VC) for an entire blockchain in a blockchain network, the method comprising:
   retrieving decentralized identifiers (DIDs) of all of the blockchain peers included within the blockchain network;
   generating a blockchain declarative descriptor (BDD) that uniquely identifies the blockchain network, the BDD comprising:
   a first field including the DIDs,
   a second field including combined signature data of all of the blockchain peers, and
   a third field including metadata;
   transmitting the BDD to a blockchain network registry;
   receiving a single document that all of the blockchain peers have signed;
   storing the single document within the second field of the BDD; and
   utilizing the VC to prove that a blockchain peer, of all of the blockchain peers, participates within the blockchain network.

9. The method of claim 8, further comprising:
   receiving a plurality of documents from corresponding ones of the plurality of blockchain peers, where each document, of the plurality of documents, is signed by a different corresponding blockchain peer; and
   storing the plurality of documents within the second field of the BDD.

10. The method of claim 8, further comprising:
    storing a blockchain network updation descriptor within the first field of the BDD.

11. The method of claim 8, wherein the retrieving the DIDs further comprises:
    retrieving the DIDs from a registry that stores a mapping between a unique identifier of a blockchain peer and a corresponding DID of that blockchain peer.

12. The method of claim 8, wherein the blockchain network registry maps a name of the blockchain network to its corresponding BDD.

13. The method of claim 8, further comprising:
    detecting a new blockchain peer within the blockchain network;
    updating the first field of the BDD to include a DID of the new blockchain peer; and
    updating the second field to include a signature of the new blockchain peer.

14. The method of claim 8, further comprising:
    identifying a chaincode installed within the blockchain network; and
    storing a name of the chaincode within the first field of the BDD.

* * * * *